(12) United States Patent
Kageyama et al.

(10) Patent No.: US 7,262,834 B2
(45) Date of Patent: Aug. 28, 2007

(54) SENSOR FOR MEASURING VELOCITY OF VIBRATION USING LIGHT WAVEGUIDE

(75) Inventors: Kazuro Kageyama, Ushiku (JP); Isamu Ohsawa, Kumagaya (JP); Makoto Kanai, Tokyo (JP); Yukiya Tsuchida, Niigata (JP); Keiichi Nagata, Tokyo (JP)

(73) Assignee: Toudai Tlo, Inc., Tokyo (JP)

( * ) Notice: Subject to any disclaimer, the term of this patent is extended or adjusted under 35 U.S.C. 154(b) by 446 days.

(21) Appl. No.: 10/745,050

(22) Filed: Dec. 23, 2003

(65) Prior Publication Data

US 2006/0152735 A1    Jul. 13, 2006

Related U.S. Application Data

(63) Continuation-in-part of application No. PCT/JP02/06422, filed on Jun. 26, 2002.

(30) Foreign Application Priority Data

| Jun. 27, 2001 | (JP) | ............................. 2001-193840 |
| Jan. 31, 2002 | (JP) | ............................. 2002-023091 |

(51) Int. Cl.
   *G01B 9/02* (2006.01)
   *G01P 3/36* (2006.01)
(52) U.S. Cl. .................... 356/28; 356/482; 356/478
(58) Field of Classification Search ................ 356/477, 356/482, 484–486, 498, 5.09, 35.5, 478, 356/28.5, 28; 385/12
See application file for complete search history.

(56) References Cited

U.S. PATENT DOCUMENTS

| 4,162,397 A | 7/1979  | Bucaro et al.            |
| 4,235,113 A | 11/1980 | Carome                   |
| 4,297,887 A | 11/1981 | Bucaro                   |
| 5,381,492 A * | 1/1995  | Dooley et al. ................ 385/12 |
| 5,589,937 A | 12/1996 | Brininstool              |
| 6,825,935 B2 * | 11/2004 | Nakamura et al. .......... 356/483 |

FOREIGN PATENT DOCUMENTS

| JP | 7-198471 A | 8/1995 |
| JP | 7-243902 A | 9/1995 |
| JP | 9-21694 A  | 1/1997 |

OTHER PUBLICATIONS

Kageyama, K., et al., "Fiber-Optic Laser Doppler Velocimetry Applied to AE Sensor," The Japan Society of Mechanical Engineers, *Proceedings of the 75th General Meeting*, vol. 2, Tokyo, Japan:94-95, 1998.

* cited by examiner

*Primary Examiner*—Hwa (Andrew) Lee
(74) *Attorney, Agent, or Firm*—Christensen O'Connor Johnson Kindness PLLC

(57) ABSTRACT

This invention provides a device or method for measuring vibration with high sensitivity and over a wide bandwidth.

A curved section is formed in an optical fiber. The curved section is disposed on a place to be measured. Light is input in the optical fiber, and then variation of frequency between the input light and the output light is detected.

Infinitesimal vibration applied to the curved section can be measured as variation of frequency between the input light and the output light. Further, it is possible to measure vibration over a wide bandwidth.

20 Claims, 22 Drawing Sheets

(a)

(b)

(c)

(a)

(b)

(c)

(a)

(b)

SENSOR FOR MEASURING VELOCITY OF VIBRATION USING LIGHT WAVEGUIDE

CROSS REFERENCE TO RELATED APPLICATION

This application is a continuation-in-part of prior International Application No. PCT/JP02/06422, filed Jun. 26, 2002, priority of which is hereby claimed under 35 U.S.C. § 120.

FIELD OF THE INVENTION

The present invention relates to a device and a method for measuring vibration.

BACKGROUND OF THE INVENTION

An AE (acoustic emission) sensor has conventionally been used to measure elastic waves (elastic vibration) of infinitesimal amplitude. Piezoelectric elements are normally used in an AE sensor. With this technology, it is possible to carry out high precision measurement by amplifying amplitude using resonance of the piezoelectric elements. However, since this technology uses resonance, there is a problem that the frequency band that can be measured is narrow.

It has also been proposed to apply laser Doppler optical fiber sensors to AE sensors. The principle of this method will be described briefly. First of all, a light source is connected to one end of the optical fiber. A reflector for reflecting input light and returning it to the fiber is attached to the other end of the optical fiber. If vibrations are applied to the optical fiber, the optical path length within the fiber will vary with expansion and contraction of the fiber. If time variation of the path length is made dL/dt, light reflected at the end of the fiber varies in frequency in direct proportion to dL/dt due to the Doppler effect. As a result, it is possible to measure vibration by measuring frequency variation between the light reflected from the fiber end and the input light. This type of sensor has a wide bandwidth, but suffers from low sensitivity.

The inventors have observed variations in frequency between input light and output light that has passed along an optical fiber, after curving the optical fiber and applying vibration to the curved section. As a result, the conclusion was reached that frequency variation occurs in the curved section in response to infinitesimal vibrations.

The present invention has been conceived based on the above conclusion, and has as its object to provide a vibration measurement device and method for measuring vibration over a wide bandwidth and with high sensitivity, while having a simple structure.

SUMMARY OF THE INVENTION

A vibration measurement device of the present invention is provided with an input section, an optical fiber and a detection section, the input section being for inputting input light to the optical fiber, the optical fiber having a curved section to which vibration to be measured is applied, the curved section being for passing the input light, and the detection section detecting frequency variations between output light from the optical fiber that has passed through the curved section and the input light.

The vibration measurement device can have the curved section formed by looping the optical fiber. The number of turns in the loop can be two or more.

The curved section can also be in an open state at one side (center of curvature side in the curved state).

A vibration measurement method of the present invention comprises arranging a curved section formed at part of an optical fiber in a place to be measured, and measuring vibration of the place to be measured, based on frequency variations in light passing through the optical fiber.

The curved section in the vibration measurement device of the present invention can be formed by looping the optical fiber around an object to be measured.

The vibration measurement method of the present invention can also measure torsional vibration by causing torsional vibration to the object to be measured to be conveyed to the curved section.

The vibration measurement method of the present invention can also measure vibration in an axial direction of an object to be measured by converting vibration in the axial direction of the object to be measured into vibration at a side surface of the object to be measured using transformation of the object to be measured, and causing the vibration at the side surface to be conveyed to the curved section attached to the side surface.

The vibration measurement device of the present invention may have a plurality of the curved sections in a single optical fiber.

The vibration measurement device of the present invention may also comprise an input section, a main body, an optical fiber and a detection section, the input section being for input of input light to the optical fiber, the main body being formed in a cylindrical shape and being capable of having a vibration conveying medium introduced to the inside, the optical fiber having a curved section formed by looping around the main body, the curved section being for passing the input light, and the detection section detecting frequency variations between output light from the optical fiber that has passed through the curved section, and the input light.

The vibration measurement method of the present invention can also comprise measuring vibration of the medium in a state where the medium has been introduced into the inside of the main body.

It is also possible to have a plurality of curved sections attached to a single object to be measured in the vibration measurement device of the present invention.

A non-destructive testing method of the present invention measures vibration at the object to be measured using the vibration measurement device.

A non-destructive testing method of the present invention can perform testing of the object to be measured by applying already known vibration to the object to be measured and measuring vibrations with the vibration measurement device based on the already known vibration.

The vibration measurement device of the present invention can comprise an input section, optical fiber and detection section, the input section being for input of input light to the optical fiber, the optical fiber having a curved section to which vibration to be measured is applied, the curved section being for passing the input light and being formed by looping the optical fiber, and a diameter of the curved section being one wavelength or less of vibration that is the object of measurement.

The vibration measurement device of the present invention can comprise an input section, an optical fiber and a detection section, the input section being for input of input light to the optical fiber, the optical fiber having a curved section to which vibration to be measured is applied, the curved section being for passing input light, and being in an open state at one side, and further, an opening length of the curved section being one wavelength or less of the vibration that is the object of measurement.

The vibration measurement device of the present invention may comprise an input section, an optical fiber for measurement light, an optical fiber for reference light and a detection section, the input section being for input of measurement light to the measurement light optical fiber, and also for input of reference light to the reference light optical fiber, the measurement light optical fiber having a curved section to which vibration to be measured is applied, the curved section being for passing measurement light, and the detection section detecting vibration applied to the curved section based on frequency variation between the measurement light and the reference light that have passed through the optical fibers respectively.

It is also possible for the measurement light optical fiber and the reference light optical fiber in the vibration measurement device of the present invention to have the same optical path length.

The measurement light optical fiber and the reference light optical fiber in the vibration measurement device of the present invention can be located in the same path.

The vibration measurement device of the present invention may have the measurement light optical fiber and the reference light optical fiber constructed to cause measurement light and reference light input to the inside of the fibers from the input section to be reflected at end sections, with the detection section then detecting variation in frequency between reflected measurement light and reference light.

It is also possible for the curved section of the vibration measurement device of the present invention to be arranged around a sphere.

The curved section of the vibration measurement device of the present invention can be arranged at the inside or the surface of an elastic material.

Instead of an optical fiber, the vibration measurement device of the present invention can utilize a light guide.

This light guide can be formed at the inside or the surface of a substrate.

An active control system of the present invention comprises any of the vibration measurement devices mentioned above, and performs control according to vibration measured by the vibration measurement device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

In FIG. 3(a) the vertical axis represents amount of displacement due to expansion and contraction of piezoelectric elements, while the horizontal axis represents time. FIG. 3(b) is a frequency spectrum diagram of FIG. 3(a). FIG. 3(c) shows frequency variation detected by the device of this example, with the vertical axis representing amount of frequency variation and the horizontal axis representing time. FIG. 3(d) is a frequency spectrum diagram of FIG. 3(c).

FIG. 4(a)-FIG. 4(d) correspond to FIG. 3(a)-FIG. 3(d).

FIG. 5(c) is a drawing for describing how to acquire the angle between the curved section 20 and the piezoelectric element.

FIG. 6(a)-FIG. 6(c) correspond to FIG. 5(a)-FIG. 5(c).

DETAILED DESCRIPTION OF THE PREFERRED EMBODIMENT

Figure 1:
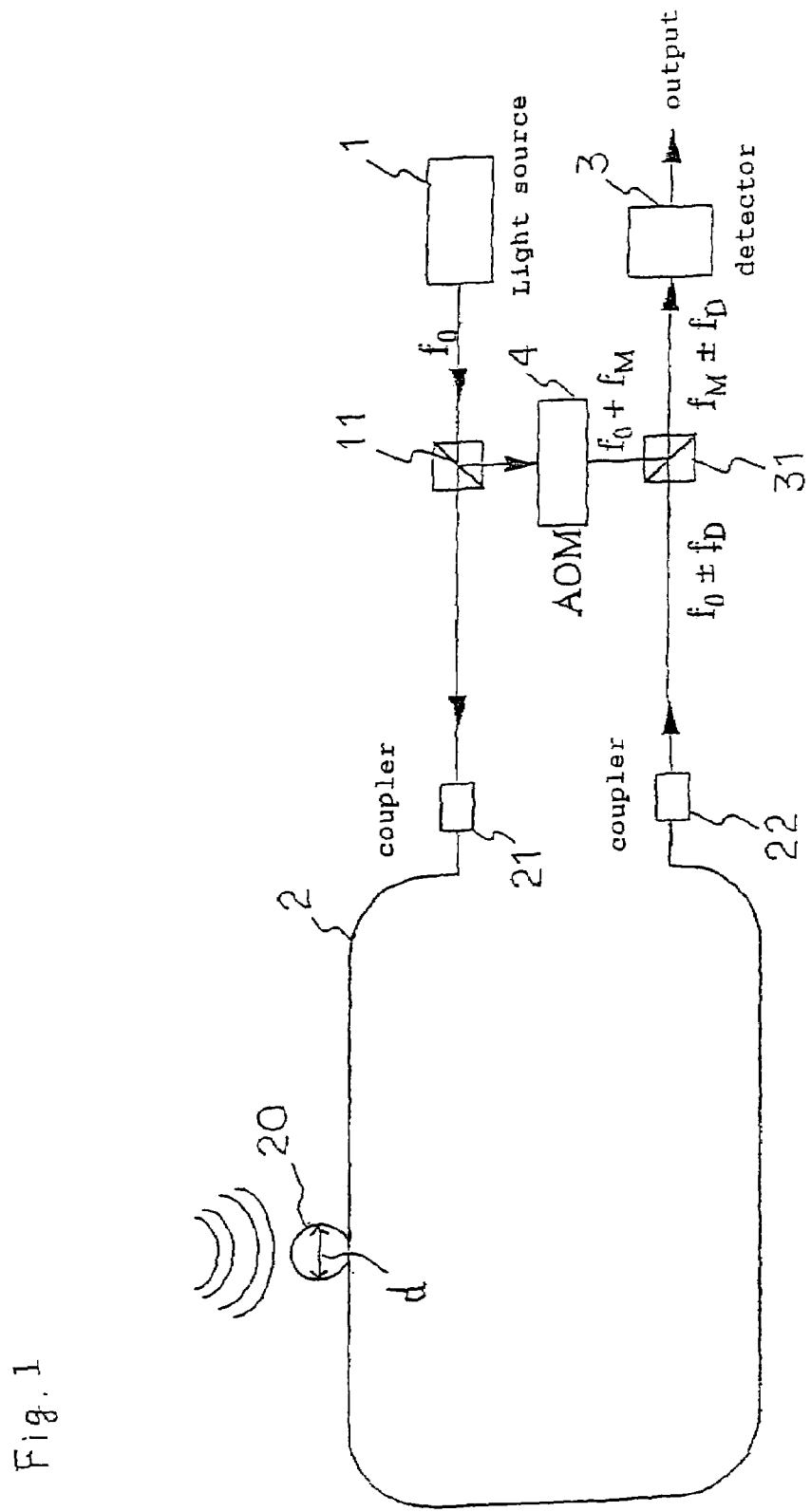
FIG. 1 is a drawing for describing the outline of a vibration measurement device of a first embodiment of the present invention.

A vibration measurement device and measurement method of a first embodiment of the present invention will now be described in the following with reference to the attached drawings.

This vibration measurement device is mainly comprised of an input section 1, an optical fiber 2, a detection section 3 and an AOM (Acoustic Optical Modulator) 4.

The input section 1 inputs input light to the optical fiber 2. For example, more specifically, the input section 1 is a laser using a semiconductor or gas. Therefore, the input section 1 can input laser light (coherent light) into the optical fiber 2. The input section 1 is connected to an optical fiber 2 via a coupler 21. A half mirror 11 for sending some of the input light to the AOM 4 is disposed between the input section 1 and the coupler 21. The frequency of the input light is not particularly limited here, and can be in the visible light range or infra-red range.

The optical fiber 2 has a curved section 20 to which vibration to be measured is applied. The curved section 20 is formed by looping the optical fiber 2. The number of turns (number of loops) is not particularly limited, but is one in this embodiment. Accordingly, the curved section 20 passes input light (measurement light) input to the optical fiber 2. The curved section 20 is located at a place where vibration will be measured. For example, the curved section 20 can be either fixed to a place to be measured by fixing means such as adhesive tape or glue, or embedded in an object to be measured. The type of optical fiber 2 is not particularly limited, and it is possible to use, for example, GI type SI type, single mode type or multi mode type, as required.

The detection section 3 detects frequency variation between output light from the optical fiber 2 that has passed through the curved section 20 and input light from the input section 1. Specifically, it is possible to take a beat of input light that has been sent through the half mirror 11, AOM 4 (described later) and half mirror 31 and output light from the optical fiber 2, to detect variations in beat frequency. In this way, frequency variations between input and output light are detected. The detection section 3 is connected to the fiber 2 through a coupler 22.

The AOM 4 is capable of converting the input light frequency $f_0$ to give $f_0+f_M$ ($f_M$ can be positive or negative). The structure of such an AOM is well known, and so detailed description thereof will be omitted. An AOM is used with this embodiment, but it is possible to use any device as long as the device can convert the frequency of the input light.

Next, a vibration measuring method using the device will be described.

First of all, the curved section 20 of the optical fiber 2 is located at a place to be measured, using arbitrary fixing means (for example adhesive tape or glue). In the meantime, input light is fed from the input section I to the optical fiber 2. If vibration (elastic wave) is applied to the curved section 20 in this state, the frequency of light passing through the curved section 20 will vary according to the vibration. That is, the frequency of output light varies. This frequency variation is detected by the detection section 3. In this way, it is possible to detect vibration applied to the curved section 20 from the location to be measured as frequency variation. In other words, it is possible to measure vibration of the location to be measured. Vibration that can be detected in the curved section 20 can be considered to be vibration having a vector component in a radial direction of the curved section 20. However, as will be described later, it is also possible to measure vibration in an axial(sideways) direction of the curved section 20 by converting vibration in the axial direction to vibration in a radial direction.

Here, with this embodiment, it is possible to change the frequency of input light input to the detection section 3 using the AOM 4. This means that it is possible to know whether frequency variation $\Delta f_2$ of light that has passed through the curved section 20 is in a positive direction or in a negative direction by changing the amount of frequency variation $\Delta f_1$ in the AOM 4. Specifically, when $\Delta f_1 > 0$, if $> \Delta f_2$ becomes large, frequency variation is in a positive direction, and if $\Delta f_2$ becomes small, frequency variation is in a negative direction. If it is possible to determined whether the variation in light frequency $\Delta f_2$ is positive or negative, it is possible to know whether vibration is positive or negative (whether it is vibration away from the curved section or vibration into the curved section). The reason for this is presumed to be as follows. Specifically, according to the present inventors' findings, amount of frequency variation is considered to depend on amount of variation in displace ment velocity of the curved section 20, in the direction perpendicular to the curved section 20. This may be expressed as an equation as follows.

$$df = -\frac{f_0}{c} \vec{V} \cdot \vec{n} d\theta \quad \text{(equation 1)}$$

Here, df is amount of variation in frequency of light that has passed though a infinitesimal section of the curved section of the optical fiber, $f_0$ is input light frequency, c is the speed of light propagating through the optical fiber, d θ is direction change of the infinitesimal segment of the curved section, $\vec{V}$ is a velocity vector of section d θ, $\vec{n}$ is a normal vector to the curved section, and the operator • is a vector scalar product. Specifically, it is considered that in the curved section 20 displacement velocity in a direction orthogonal to the optical fiber 2, and amount of variation in the frequency of light, are proportional.

Here, if it is possible to know whether variation in light frequency is in a positive direction or a negative direction, it is possible to detect whether deformation amount is positive or negative based on the discussion above. Specifically, it is conceivable that it is possible to know whether deformation is in a direction collapsing the curved section 20 or in a direction extending the curved section 20. If it is not necessary to know the direction of frequency variation (for example, when it is possible to only determine intensity of vibration), the AOM does not need to be fitted.

According to the device of this embodiment, it is possible to measure vibration at a particular place using ordinary optical fiber simply by putting a curve into the optical fiber at the place where measurement is to be performed. As a result, there is the advantage that structure of the device is simplified.

Figure 27:
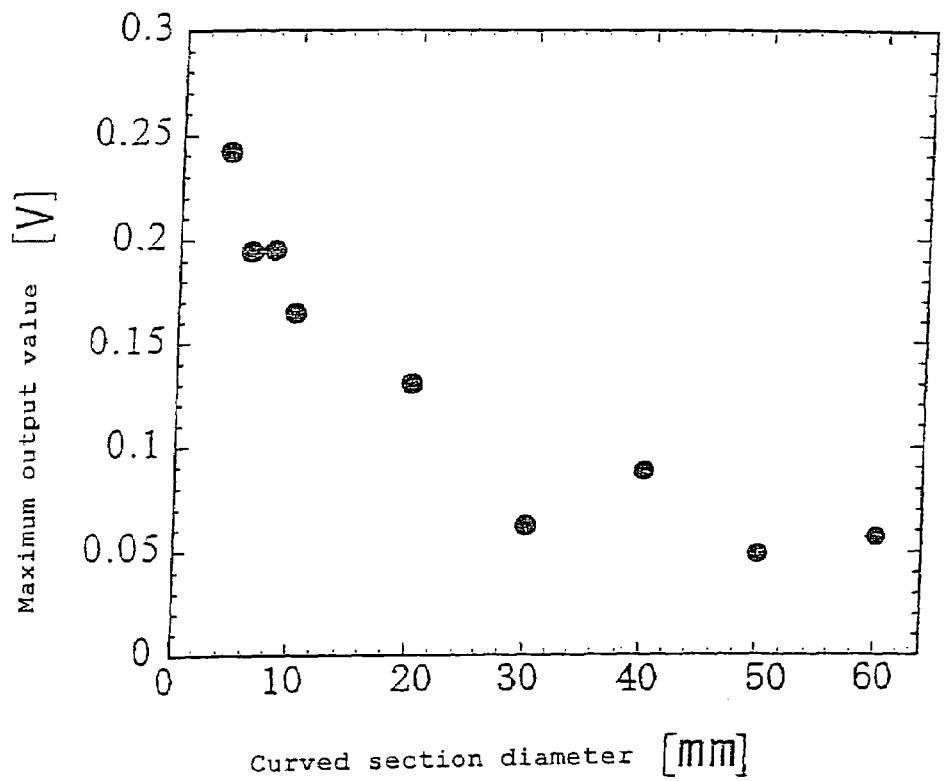
FIG. 27 is a graph showing a relationship between diameter of a loop shaped curved section and detection sensitivity.

A diameter d (refer to FIG. 1) of the curved section 20 having a loop shape is preferably one wavelength or less of the vibration that is the subject of measurement. Results of measuring detection sensitivity with variation in diameter are shown in FIG. 27. It is assumed that one wavelength of vibration is 30 mm. With a diameter of 30 mm or greater, sensitivity hardly changes. However, with a diameter of one wavelength or less sensitivity increases.

Figure 2:
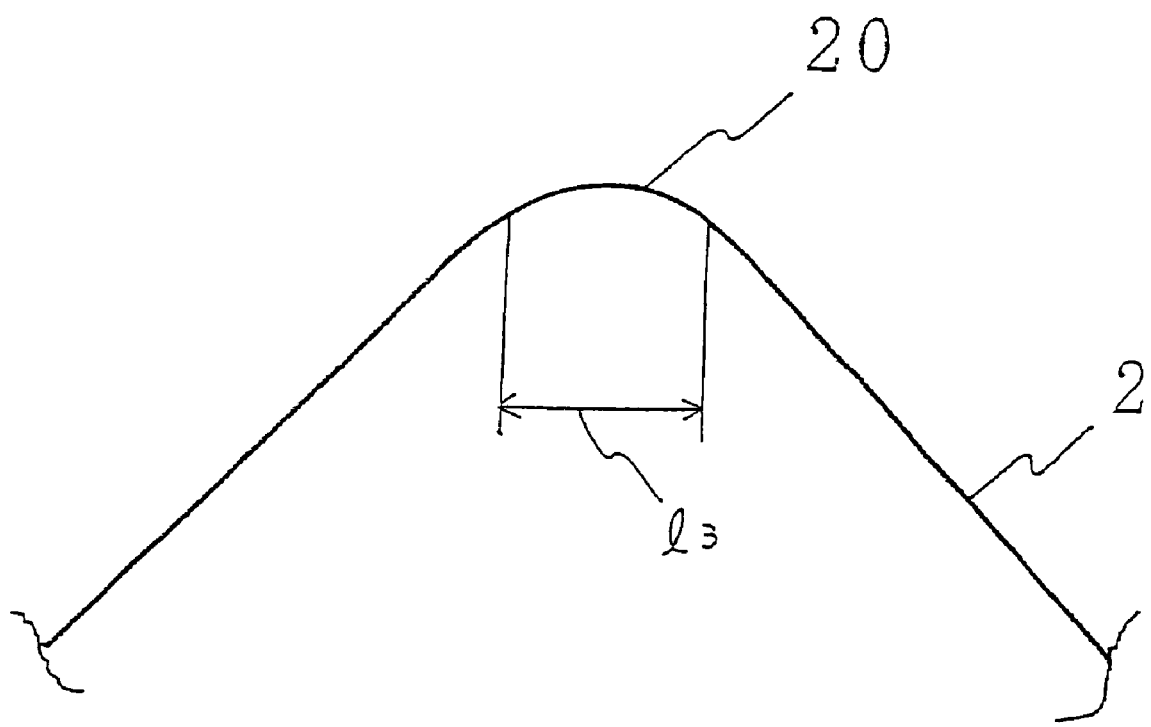
FIG. 2 is a drawing showing another example of a curved section of the first embodiment of the present invention.

In this embodiment, the curved section 20 has been formed by looping the optical fiber 2. However, it is also possible, as shown in FIG. 2, to form the curved section 20 to have an open state at one side, namely a center of curvature side in the curved state (lower side of the drawing). In this case, sensitivity is high for vibration from a direction intersecting the optical fiber 2, but low for vibration from a direction along the optical fiber 2 (refer to example 2, described later). This means that there is an advantage that it is possible to maintain directivity in vibration measurement in this case. Also, in the example of FIG. 2, a light direction between the input light and the output light is changed so as to tend upwards or downwards.

An opening length $l_3$ (refer to FIG. 2) of the curved section 20 is preferably one wavelength or less of the vibration that is the object of measurement, as with the looped shaped curved section 20.

Also, the number of turns with this embodiment is made 1, but it is also possible to be two or more. In this case it is possible to improve sensitivity to vibration (refer to example 3, described later).

EXAMPLES

Next, an example and a comparative example using the device and method of the embodiment described above will be described.

Example 1

The whole of a curved section 20 is attached onto a plate (specifically, reinforced plastic) using adhesive tape. Fiber 2 other than the curved section 20 is not attached to the plate. At this time, the curved section 20 is formed by coiling a single turn. The circumference of the curved section 20 is 62 mm. A piezoelectric element is attached on the same plate, as a vibration source. This piezoelectric element therefore applies vibration to the plate according to an applied a.c. voltage. The distance between the curved section 20 and the piezoelectric element is made 50 mm. Referring to FIG. 1, the position of the piezoelectric element is directly above the curved section 20.

In this state, the piezoelectric element is made to vibrate. A vibration waveform of the piezoelectric element is shown in FIG. 3(a), while a frequency spectrum obtained through Fourier analysis of this vibration is shown in FIG. 3(b). Also, frequency variation of output light at this time is shown in FIG. 3(c), and a frequency spectrum of FIG. 3(c) is shown in FIG. 3(d). The vertical axis in FIG. 3(c) is amount of variation in frequency.

Figure 3:
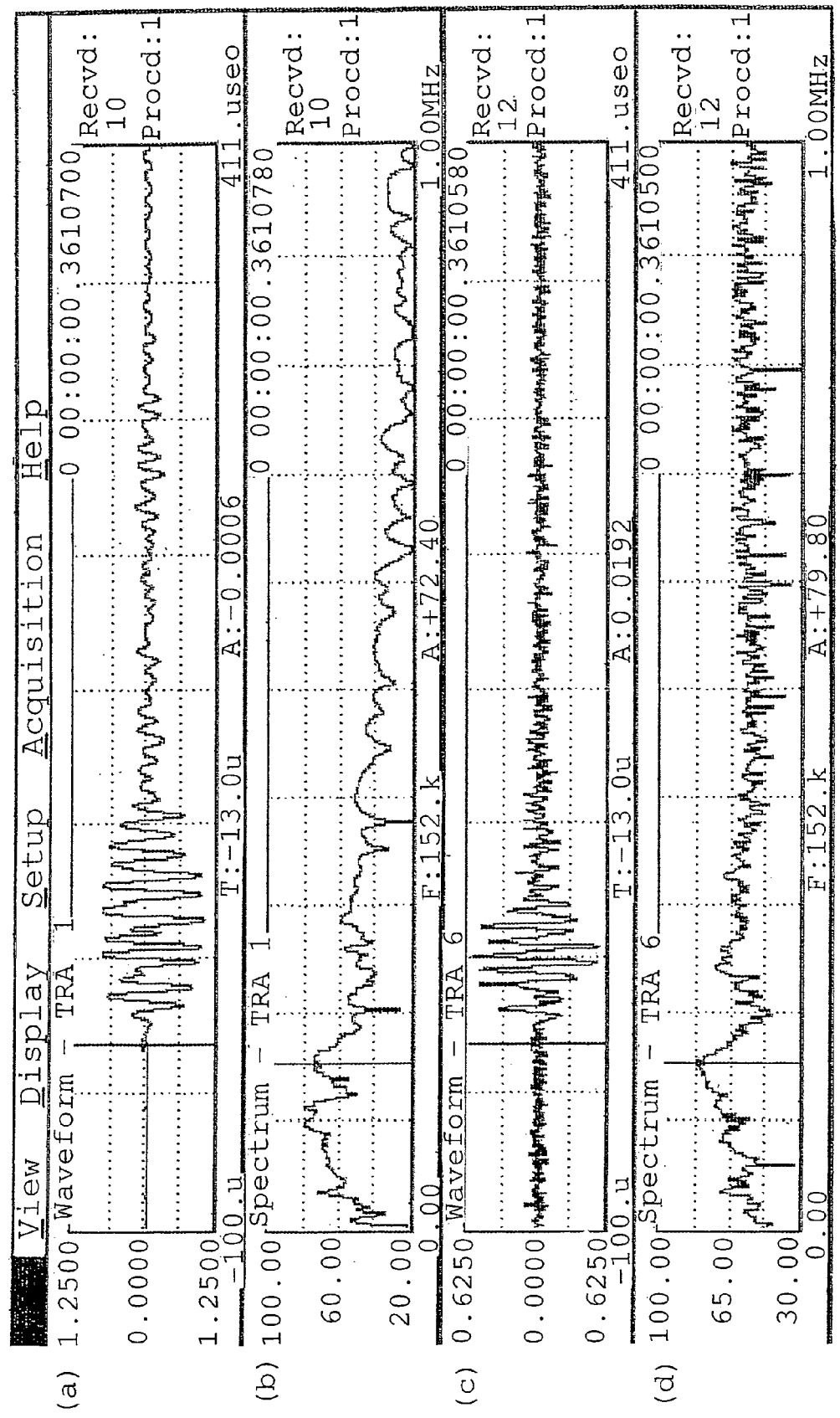
FIG. 3 is screen displays of graphs showing test results for a first example of the first embodiment.

As will be understood from FIG. 3, the infinitesimal amplitude obtained from the piezoelectric element can be detected with a comparatively high sensitivity using this device. Furthermore, as will be understood from comparison of the spectrums, detection over a wide range is realized.

Comparative Example 1

For the purposes of comparison, a straight optical fiber without a curved section was attached to the plate using adhesive tape, over a length of 62 mm. The distance between the attached fiber and the piezoelectric element was 50 mm. Other conditions were the same as example 1.

Figure 4:
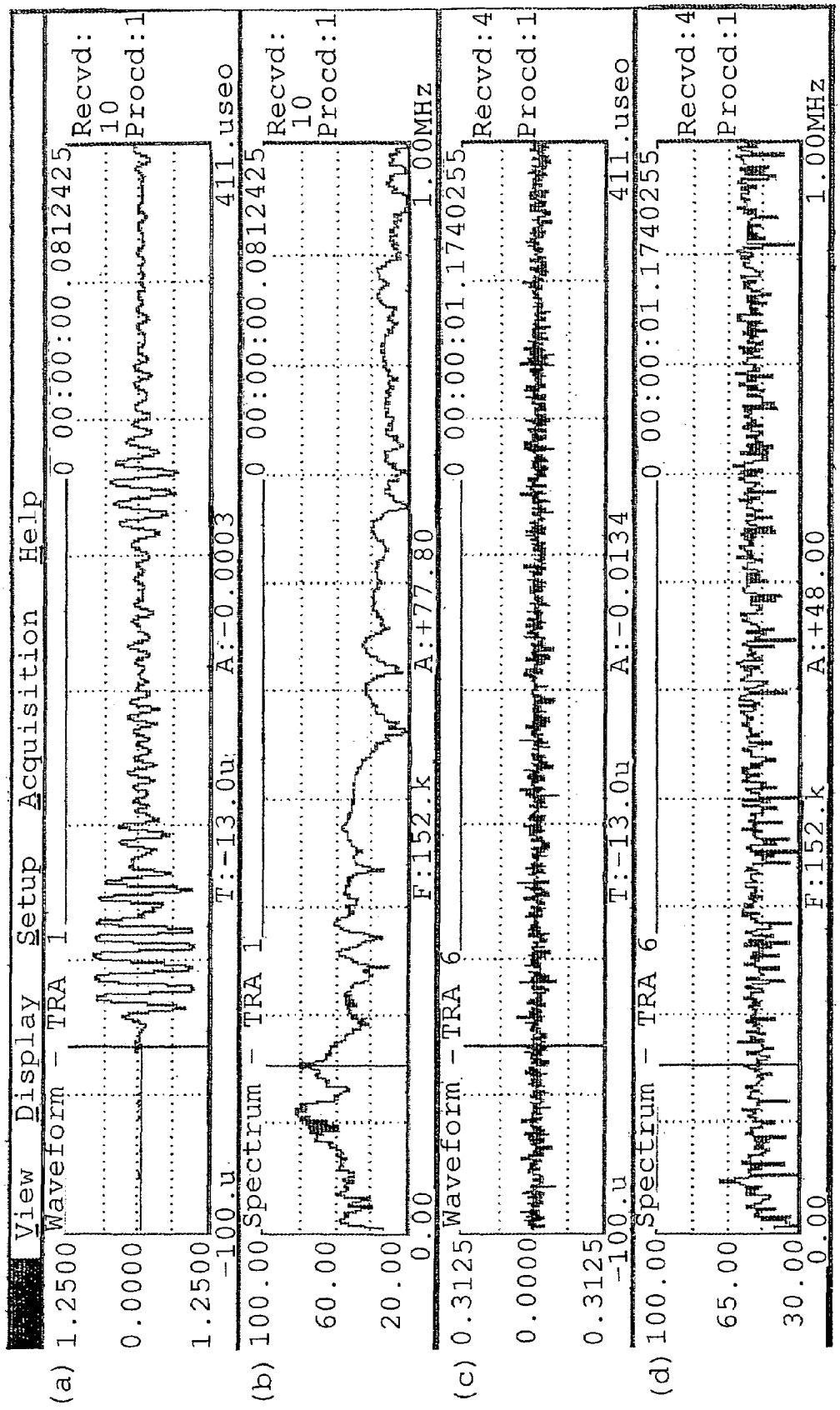
FIG. 4 shows screen displays of graphs showing test results for comparative example 1 of this embodiment.

Results are shown in FIG. 4. It will be understood that with the fiber that does not have a curved section, it is virtually impossible to detect vibration of the piezoelectric element.

Example 2

With example 2, the curved section 20 was formed having one side (center of curvature side) open, the same as in the example of FIG. 2. Other conditions were the same as for example 1.

Figure 5:
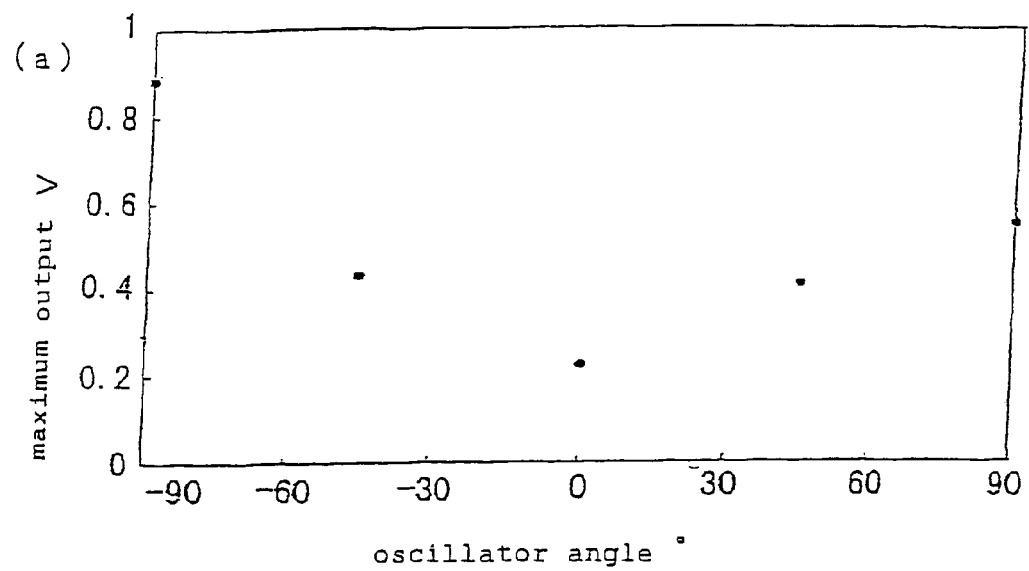
FIG. 5 is graphs showing test results of a second example of the embodiment, with the vertical axis in FIG. 5(a) representing amount of frequency variation detected according to vibration as an output voltage [V] obtained in a detection section 3, while the horizontal axis represents an angle of a piezoelectric element with respect to a curved section 20. The vertical axis in FIG. 5(b) is a logarithmic representation of the vertical axis in FIG. 5(a).
Figure 5:
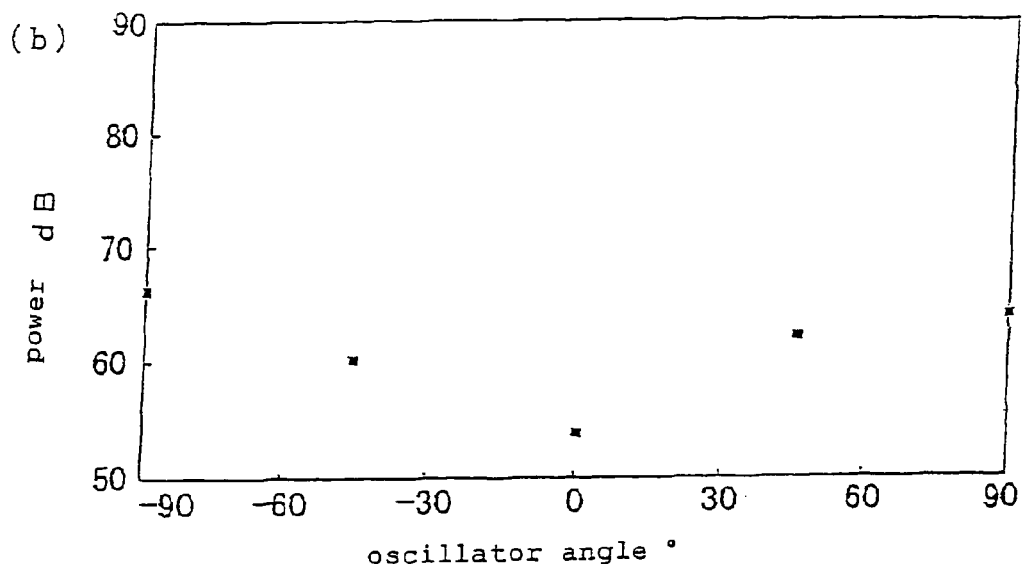
Figure 5:
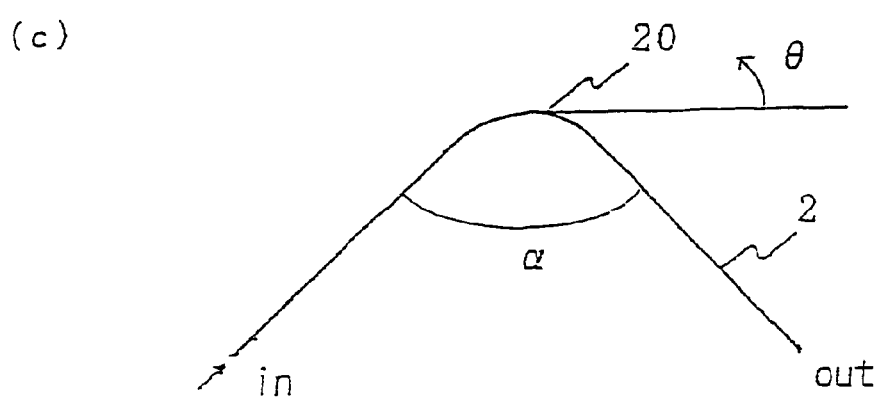

Under these conditions, the piezoelectric element was made to vibrate. The position of the piezoelectric element was varied 30° at a time. Amount of frequency variation in response to angle is shown in the graph of FIG. 5(a) as a voltage value. FIG. 5(b) is a graph representing this amount of variation as a logarithm. Here, the method of acquiring an angle is shown in FIG. 5(c). With this example, rotation in the θ direction in the drawing (that is, in an anti-clockwise direction) is made positive. A radius of curvature at a tip of the curved section 20 is about 5 mm, and an overall bending angle is about 90°.

From these results, it will be understood that in the case of opening one side of the curved section 20, there is directivity, meaning that sensitivity to vibration from a center of curvature side or from the opposite side to that is good. This means that it is possible to obtain a vibration sensor having directivity, in turn making it possible to obtain a vibration sensor that is effective for detecting vibration position.

Comparative Example 2

For the purpose of comparison, measurement was performed with the vibration measurement device of example 1, using the looped curved section 20 (refer to FIG. 1). The method of obtaining angle θ of the piezoelectric element in this case is shown in FIG. 6(c).

Figure 6:
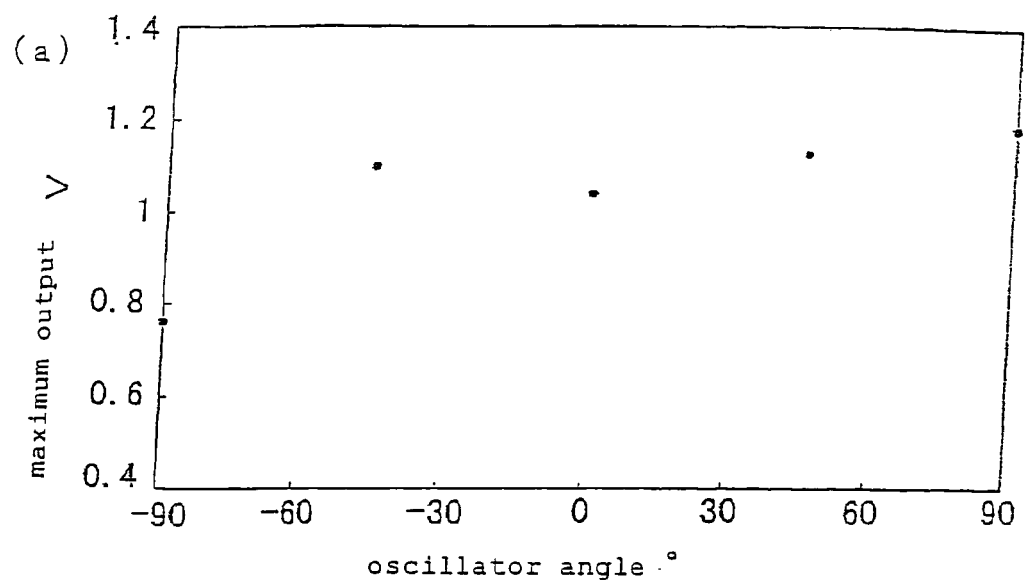
FIG. 6 is a graph showing test results for the second comparative example of this embodiment.
Figure 6:
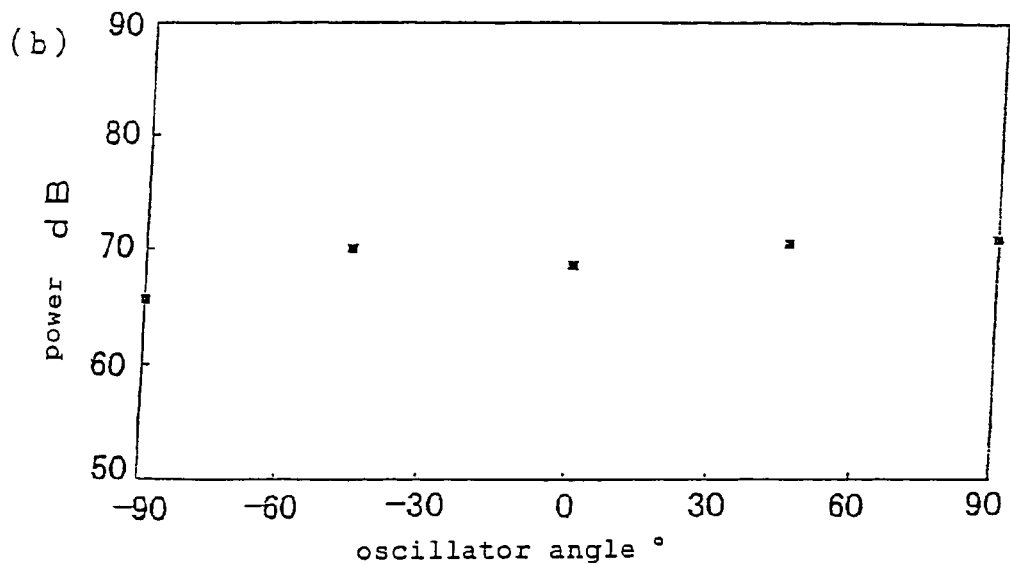
Figure 6:
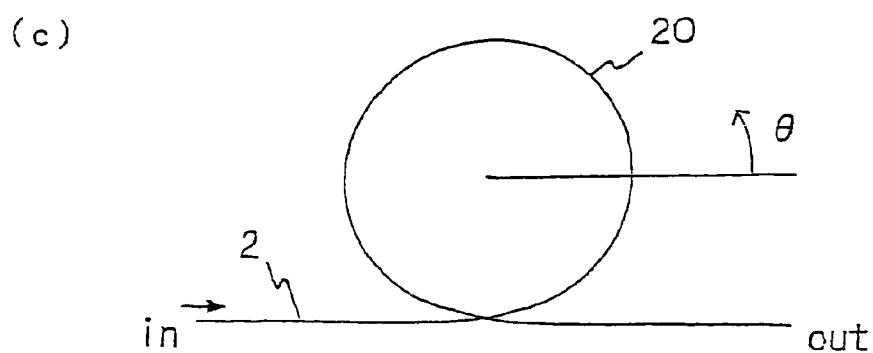

Measurement results are shown in FIG. 6(a) and 6(b). It will be understood that with the looped curved section 20 that is not opened directivity is low. As a result, it will be understood that the device of example 1 is suited to non-directional vibration measurement.

Example 3 and Comparative Example 3

With example 3, a curved section 20 was formed with a plurality of loops. The number of loops was made 2, 5 and 10. The radius of curvature of the curved section was 5 mm. The remaining conditions were the same as example 1.

Figure 7:
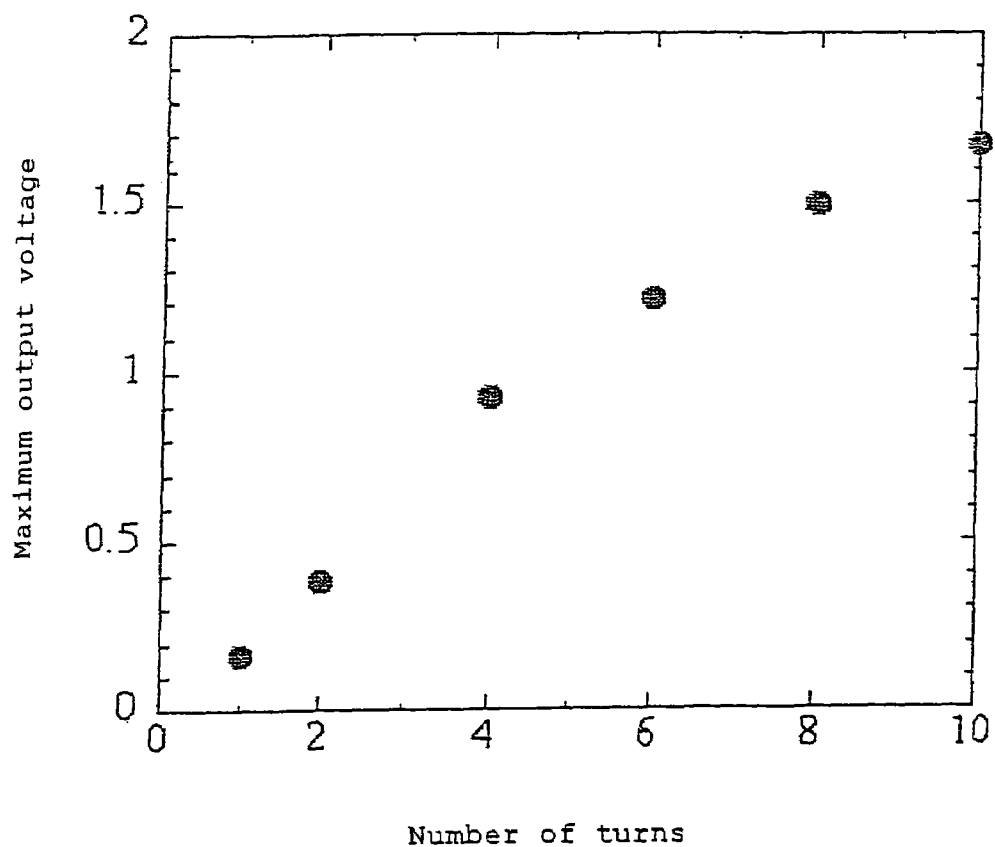
FIG. 7 is a graph showing test results of a third example of the embodiment and a third comparative example. The vertical axis in this graph represents amount of frequency variation detected according to vibration as an output voltage [V] obtained in a detection section 3, while the horizontal axis represents number of turns of a curved section 20.

Under these conditions the piezoelectric element was made to vibrate. Amount of frequency variation output as a voltage value is shown in the parts of FIG. 7 for 2 turns, 4 turns, 6 turns, 8 turns and 10 turns.

As comparative example 3, measurement was performed with the number of turns of the curved section 20 made 1, and remaining conditions the same as for example 3. Results are shown at the part of FIG. 7 for 1 turn.

From comparison of the two, it will be understood that as the number of turns is increased, sensitivity increases.

Next, a vibration measurement device and method of a second embodiment of the present invention will be described based on FIG. 8. With this embodiment, reference numeral 5 is an object to be measured, and has a cylindrical outer surface. The optical fiber 2 is looped around the outer surface of the object to be measured 5. In this way, the curved section 20 is formed in the optical fiber 2. With this type of structure, by attaching the object to be measured 5 as a probe to an arbitrary place, it is possible to measure vibration at an arbitrary location through the object to be measured 5. Remaining structure and advantages are the same as for the first embodiment, and description thereof will be omitted.

Figure 8:
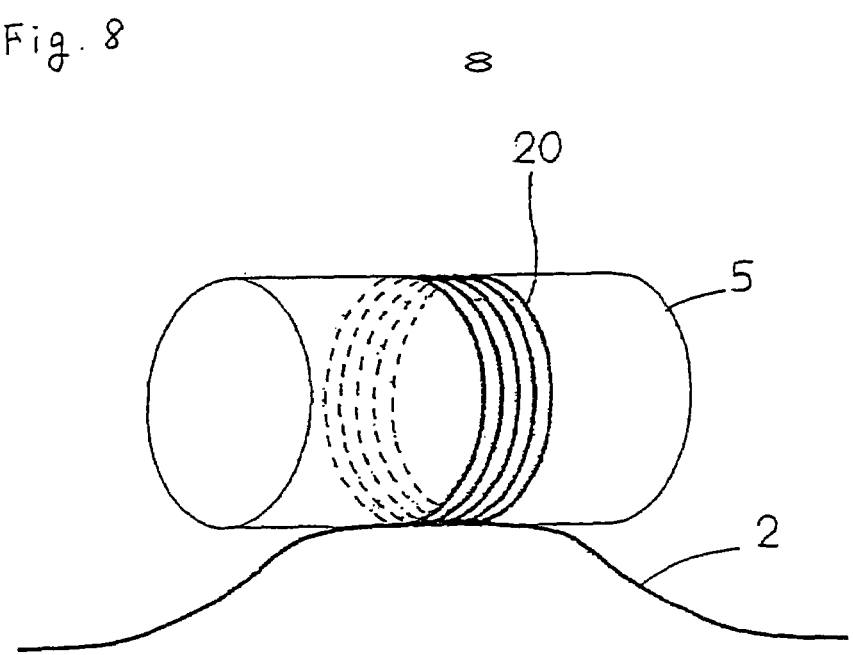
FIG. 8 is a drawing for describing essential parts of a vibration measurement device of the second embodiment of the present invention.
Figure 9:
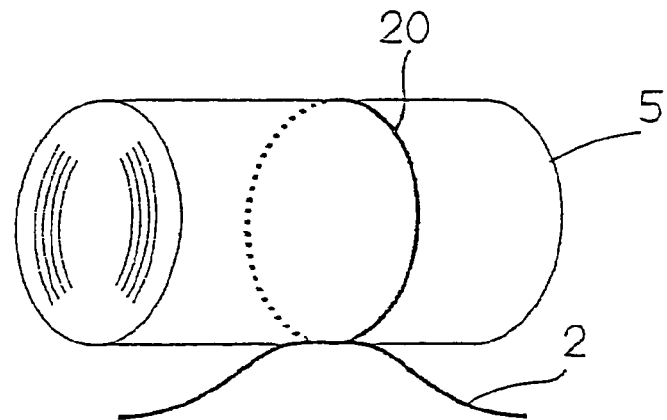
FIG. 9 is a drawing for describing essential parts of a vibration measurement device of the second embodiment of the present invention.

In the example shown in FIG. 8, the optical fiber 2 is looped around the object to be measured 5 a number of times, but it is also possible to have only one loop, as shown in FIG. 9.

Figure 10:
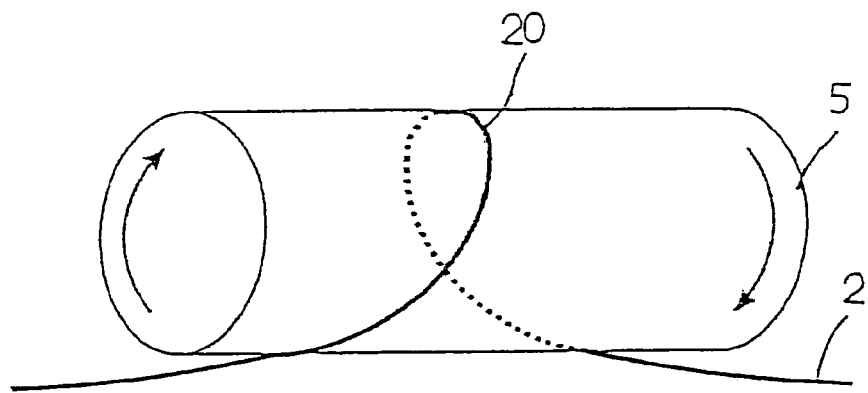
FIG. 10 is a drawing for describing essential parts of a vibration measurement device of a third embodiment of the present invention.

Next, a vibration measurement device of a third embodiment of the present invention will be described based on FIG. 10. With this embodiment, with respect to the object to be measured 5, the optical fiber 2 is looped in an inclined direction. By doing this, there is the advantage that it is easy to measure torsional vibration acting on the object to be measured 5. Remaining structure and advantages are the same as for the second embodiment.

Figure 11:
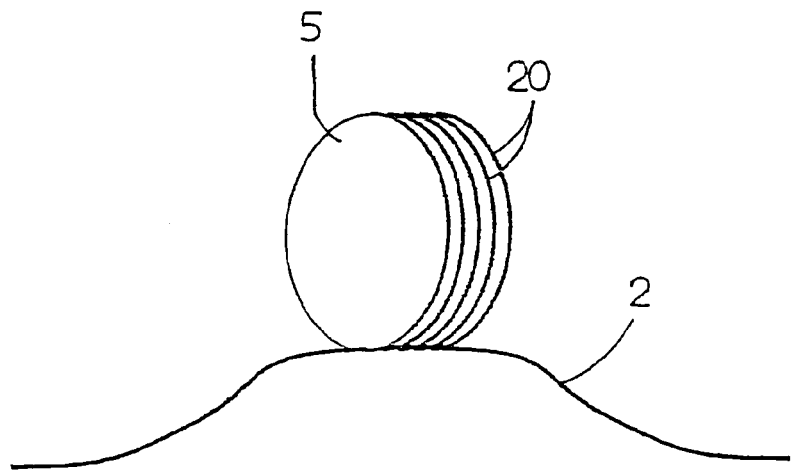
FIG. 11 is a drawing for describing essential parts of a vibration measurement device of a fourth embodiment of the present invention.

Next, a vibration measurement device of a fourth embodiment of the present invention will be described based on FIG. 11. With this embodiment, the object to be measured 5 has a short cylindrical shape. Similarly to the example shown in FIG. 8, this object to be measured 5 is wound with the optical fiber 2 to form a curved section 20. According to this fourth embodiment, vibration applied to the object to be measured 5 in an axial direction of the object to be measured 5 can be converted to vibration of the peripheral surface of the object to be measured 5 in accordance with the Poisson's ratio of the object to be measured 5. Vibration converted in this way is transmitted to the curved section 20. This enables measurement of vibration that has been applied in an axial direction of the object to be measured 5. In doing this, it is conceivable to use this vibration measurement device as an acoustic pickup. It is also possible to construct the object to be measured 5 using a piezoelectric element. In this way, it is possible to measure variation in voltage applied to the object to be measured 5 as vibration.

Next, a vibration measurement device of a fifth embodiment of the present invention will be described based on FIG. 12. With this embodiment, a plurality of curved sections 20 are provided for a single optical fiber. Specifically, a single optical fiber 2 is looped at a plurality of locations on the object to be measured 5 (two places in the example shown in the drawing). In this way, vibration produced at the plurality of locations on the object to be measured 5 can be measured using the curved sections 20 in the vicinity of the locations in question. This type of structure is preferable in order to detect vibration caused by damage to the object to be measured 5 etc. Since optical fiber generally has low loss, it is possible to reduce drops in gain of the output light, even if the single optical fiber 2 is long.

Figure 12:
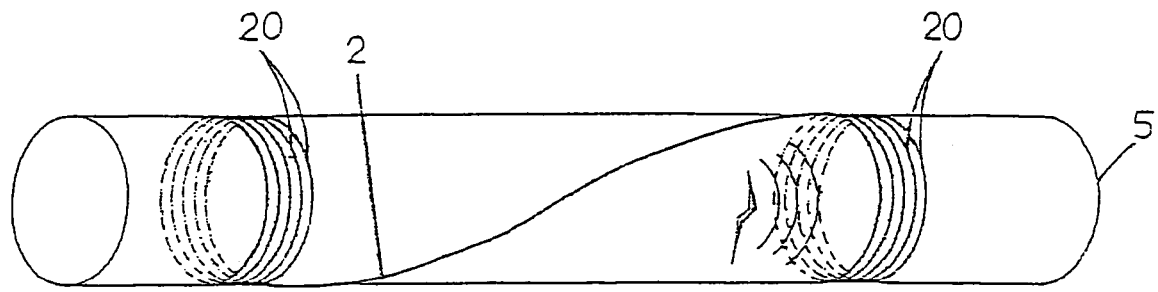
FIG. 12 is a drawing for describing essential parts of a vibration measurement device of a fifth embodiment of the present invention.

Also, with this embodiment, the light fiber 2 between the plurality of curved sections 20 is looped loosely (refer to FIG. 12). If the optical fiber 2 is disposed along the axial direction of the object to be measured 5, the length of the optical fiber 2 is varied by bending of the object to be measured 5. If this length is made L, then as already known, the frequency of light passing through the optical fiber 2 varies according to dL/dt. Frequency variation attributable to bending constitutes noise when the objective is to measure vibration. If the optical fiber 2 is looped loosely, as shown in FIG. 12, expanded sections and contracted sections arise in the optical fiber 2 depending on the location, due to bending of the object to be measured 5. Therefore, overall it is possible to substantially cancel any stretching. In this way, there is the advantage that it is possible to carry out vibration measurement more accurately.

Figure 13:
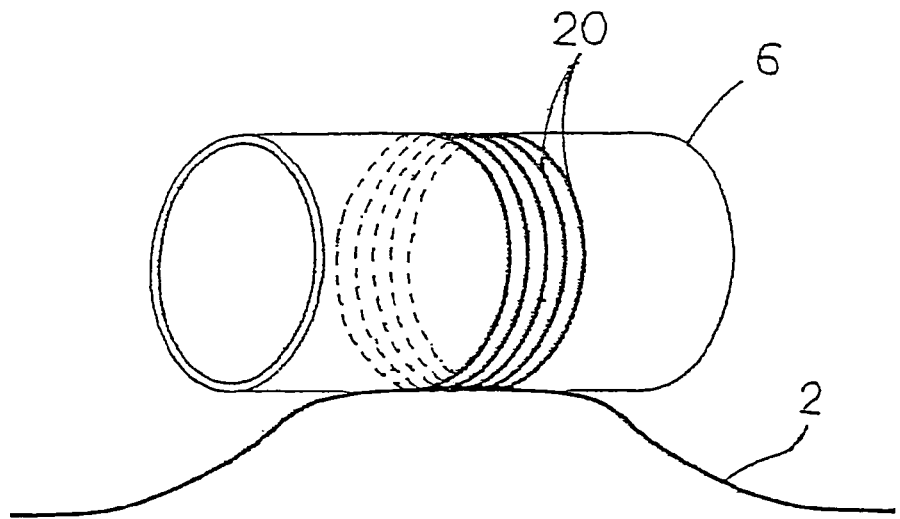
FIG. 13 is a drawing for describing essential parts of a vibration measurement device of a sixth embodiment of the present invention.

Next, a vibration measurement device of a sixth embodiment of the present invention will be described based on FIG. 13. This device has a main body 6. The main body 6 corresponds to the object to be measured in the previous embodiment. The main body 6 is formed in a hollow cylindrical shape. Both end surfaces of the main body 6 are open. With this structure, it becomes possible to introduce a vibration transmitting medium (a medium capable of transmitting pressure waves or elastic vibrations) into the main body 6 with this embodiment. An optical fiber 2 is looped around the outside of the main body 6, in the same manner as the previous embodiment, thus forming the curved section 20. The remaining structure is the same as the second embodiment described above.

The vibration measurement device of the sixth embodiment can be used as a sensor(for example, an underwater acoustic sensor) for vibration inside the vibration transmitting medium(for example, liquid such as water). A gas can also be used as an elastic vibration medium. In this case, it is useful as a sensor for air-borne sound. In the sixth embodiment, the medium is normally introduced into the main body 6 (for example, by filling the main body 6 with water), and vibration transmitted from the medium to the main body 6 is measured.

Example 4

Figure 14:
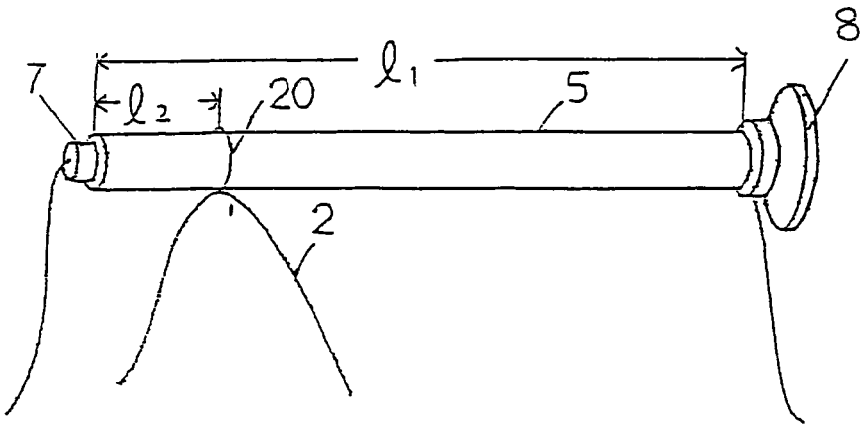
FIG. 14 is a drawing for describing essential parts of a vibration measurement device of a fourth example of the present invention.

A steel cylindrical member was used as the object to be measured 5, and vibration measurement performed. First of all, the device structure will be described based on FIG. 14. The length of the object to be measured $l_1$ was 4 m, and the diameter was 15 mm. As mentioned in the second embodiment described above, the optical fiber 2 was looped around the object to be measured 5. The location for the loop was made a distance $l_2$ of about 50 cm from one end (the left end in the drawing) of the object to be measured 5. A curved section 20 was made by looping the optical fiber 2. Similarly to FIG. 1, suitable components such as an input section 1, detection section 3 and AOM 4 are connected to the optical fiber 2. In this example, a band pass filter (not shown) for extracting a specified frequency band from among vibrations detected by the detection section 3 is also connected. This filter can be formed as an analog filter or a digital filter.

An ultrasonic oscillator 7 is attached to one end of the object to be measured 5. In this example, the ultrasonic oscillator 7 generates vibrations of 230 kHz. A low-frequency oscillator 8 is attached to the other end of the object to be measured 5. In this example, the low-frequency oscillator 8 generates vibrations of 605 Hz.

Figure 15:
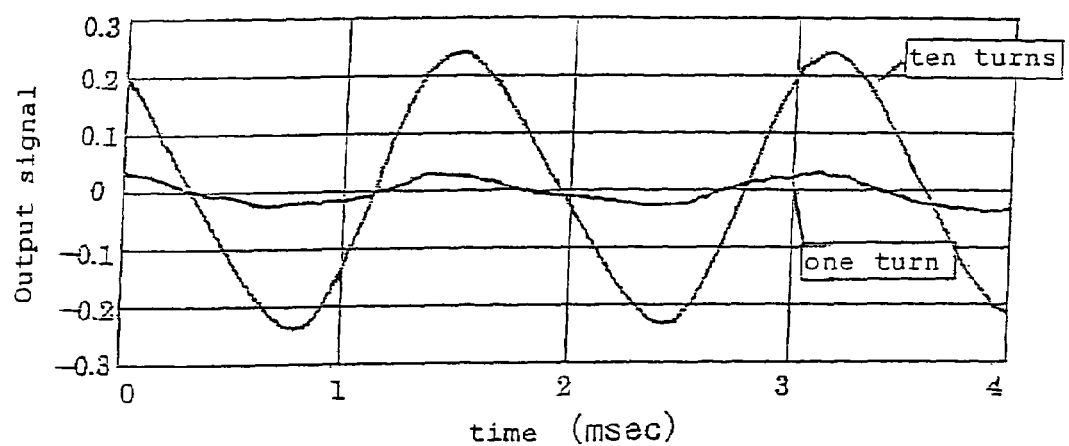
FIG. 15 is a graph showing measurement results (close to 605 Hz) for the fourth example of the present invention.

Next, a vibration measurement method for this example will be described. First, the ultrasonic oscillator 7 and the low-frequency oscillator 8 are made to operate to apply respective vibrations to the object to be measured 5. This vibration is detected by the curved section 20, optical fiber 2 and detection section 3 (refer to FIG. 1). Among the detected vibrations, a component around 605 Hz is extracted by the filter. A waveform for the extracted vibration is shown in FIG. 15. The drawing shows the case where the number of turns of the optical fiber 2 is ten, and the case where the number of turns is one. It will be understood that ten turns gives higher sensitivity, and that S/N ratio is also improved.

Figure 16:
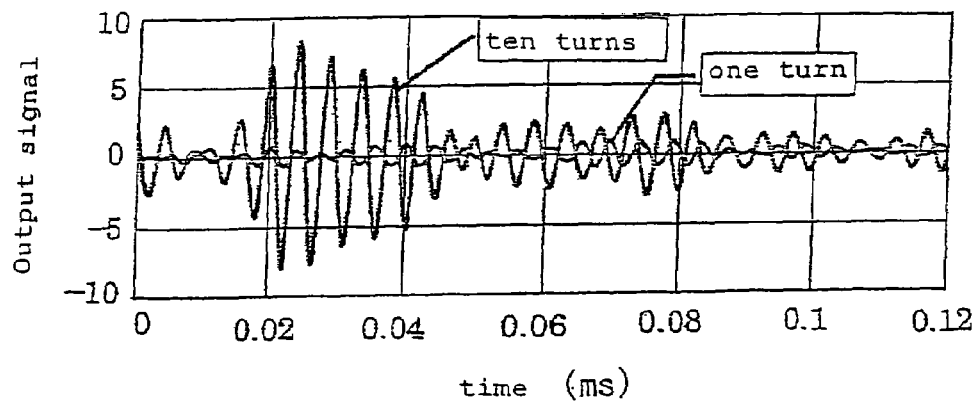
FIG. 16 is a graph showing measurement results (close to 230 Hz) for the fourth example of the present invention.

At the same time, a component close to 230 kHz among the vibrations detected by the detection section 3 is extracted by the filter. A waveform of the extracted vibration is shown in FIG. 16. This drawing also shows the case where the number of turns of the optical fiber 2 is ten, and the case where the number of turns is one.

Here, an amount of frequency variation at the curved section 20 can be considered to be independent of the radius of the looped section, for the following reason. First of all, if equation (1) above is integrated with a loop of radius R, we get the following $$\Delta f = -\frac{f_0}{c} \oint \frac{1}{R} \vec{V} \cdot \vec{n} \, ds \quad \text{equation (2)}$$

In the case where the curved section 20 is looped around a cylinder, a component of velocity is always in a direction perpendicular to the looped section, which means that:

$$\vec{V} \cdot \vec{n} = V_R(t) \quad \text{equation (3)}$$

Also, since the component of velocity is independent of θ direction, in the case where frequency is m, frequency variation at the curved section 20 is given by;

$$\Delta f = -\frac{2\pi m f_0}{c} V_R(t) \quad \text{equation (4)}$$

and there is no longer any dependence on the radius of the looped section.

The following will be understood from this example. First, by attaching the curved section 20 to the cylindrical object to be measured 5 (that is, the main body 6), it is possible to measure vibration of the object to be measured.

Second, even if vibrations having different frequency components are input, it is possible to measure these respective frequency vibrations with a curved section 20 formed with a single optical fiber 2.

If the radius of curvature of the curved section 20 of the optical fiber 2 is made smaller than 5 mm-10 mm, there is greater dependence on the quality of the optical fiber, but bending loss becomes large so practical implementation will be difficult.

Figure 17:
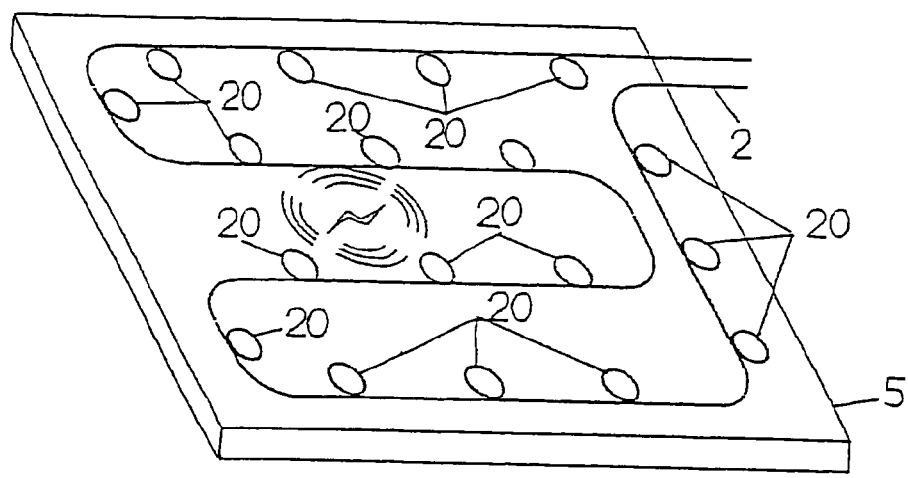
FIG. 17 is a drawing for describing essential parts of a vibration measurement device of a seventh embodiment of the present invention.

Next, a measurement device of a seventh embodiment of the present invention will be described based on FIG. 17. With this embodiment, a single optical fiber 2 is looped at a number of locations, to form a plurality of curved sections 20. The plurality of curved sections 20 are attached to an object to be measured 5 as a single test region, as shown in FIG. 17. This object to be measured 5 is formed in a panel shape. In the seventh embodiment, if vibration is applied to any one or a plurality of the curved sections 20 due to damage to the object to be measured 5 or for other reasons, that vibration can be detected by the detection section 3. This method of use is suitable for monitoring structures.

Figure 18:
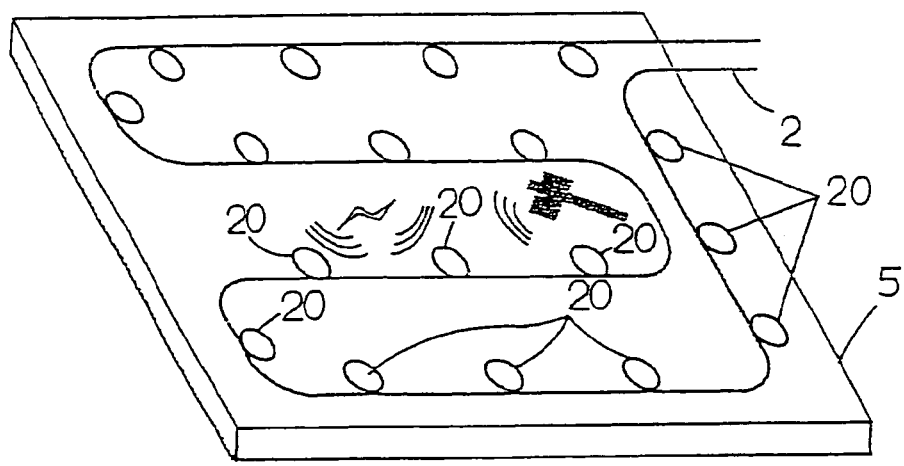
FIG. 18 is a drawing for describing a non-destructive testing method using the vibration measurement device of the seventh embodiment of the present invention.
Figure 19:
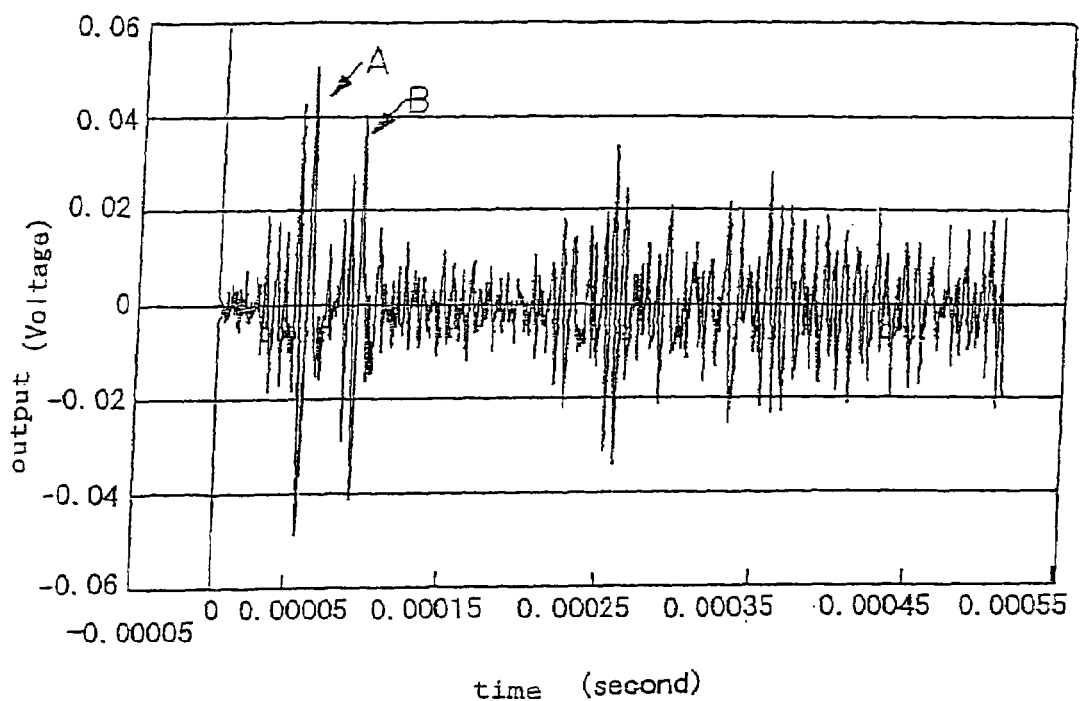
FIG. 19 is a graph showing measurement results using the vibration measurement device of the seventh embodiment of the present invention.

The measurement device shown in FIG. 17 is also suitable for active non-destructive testing of an object to be measured 5. This method of use is shown in FIG. 18. Vibration is applied to the object to be measured 5 using a vibration generator or a hammer. Vibration corresponding to damage is applied to each curved section 20. This vibration is acquired by the plurality of curved sections 20 and measured. Necessary information, such as location and extent of damage to the object to be measured 5 is acquired based on characteristics of the detected vibration (waveform, transmission time etc.). This is because, in the damaged portion, variation in frequency or amplitude of vibration occurs. FIG. 19 shows one example of output. As shown here, in the event that two waves A and B have been measured, information such as damage location is inferred from time interval and attenuation for both waves. In performing this inference, it is possible to use appropriate means, such as, for example, creating a plurality of instructional examples and then carrying out inference using a neural network constructed based on these instructional examples.

As has already been described, it is possible to improve output gain for detected vibration by increasing the number of loops of the curved section 20. It therefore follows that it is possible to suppress noise due to vibration, other than the components to be detected, applied to the optical fiber 2 by increasing the number of loops of the curved section 20 subjected to detection.

Experimental Example

Figure 20:
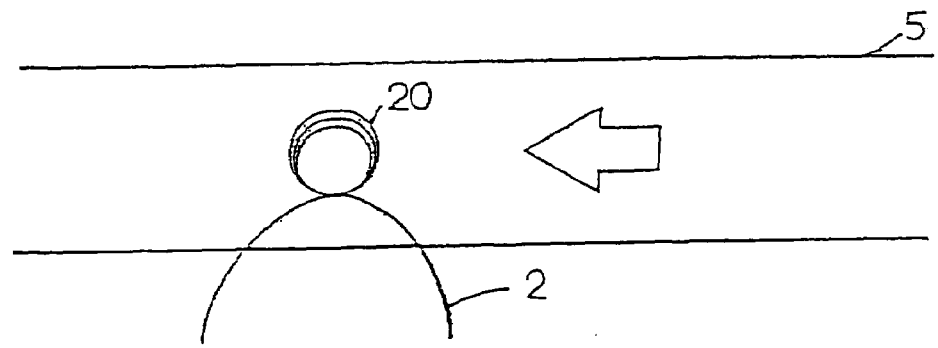
FIG. 20 is a drawing for describing essential parts of a vibration measurement device used in a test example of the present invention.

Testing to detect debonding of a surface of a plate shaped object to be measured 5 was carried using the device of the first embodiment! The object to be measured 5 comprised a CFRP/aluminum-honeycomb sandwich. A loop shaped curved section 20 was fastened to the surface of the object to be measured 5 (refer to FIG. 20). An object that was already debonded was used as the object to be measured 5. Elastic waves were applied to this object to be measured 5. Here, the positional relationship of the debonding, the vibration source and the curved section 20 is varied as shown in FIG. 21-FIG. 24. In each drawing, a debonded region 5a is shown by hatching. The length of the debonding was 300 mm, and conditions in each drawing will be described in the following.

Figure 21:
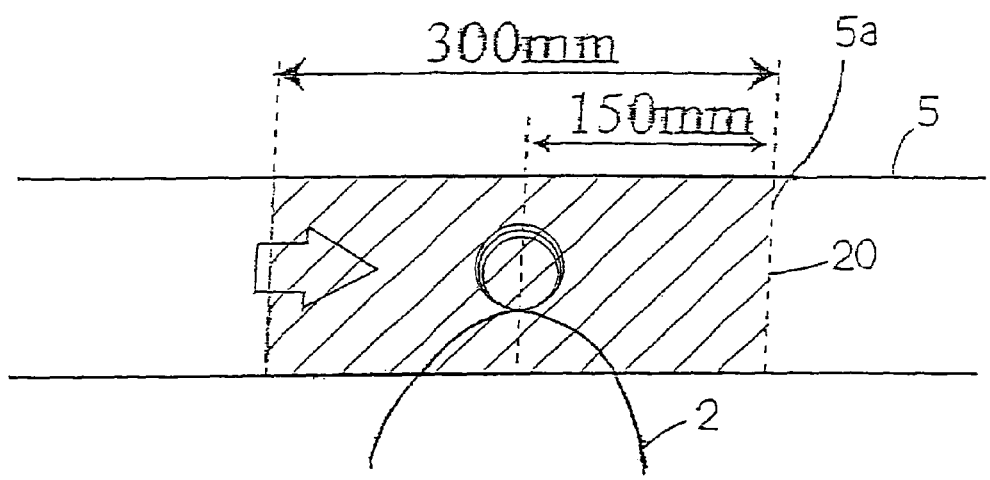
FIG. 21 is a drawing for describing essential parts of a vibration measurement device used in a test example of the present invention.

(1) In FIG. 21, the curved section 20 is located in the center of the debonded region 5a. Also, elastic waves were input from an outer side of the debonded region 5a (in the direction of the arrow in the drawing).

Figure 22:
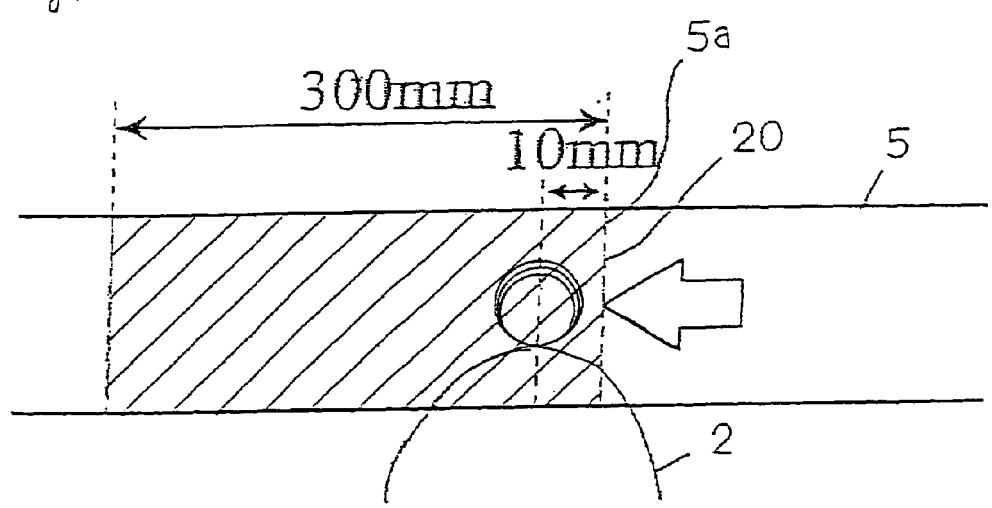
FIG. 22 is a drawing for describing essential parts of a vibration measurement device used in a test example of the present invention.

(2) In FIG. 22, the curved section 20 is located close to the end of the debonded region 5a (at a position about 10 mm from the end). Elastic waves were input from an outer side of the debonded region 5a (a normal section side).

Figure 23:
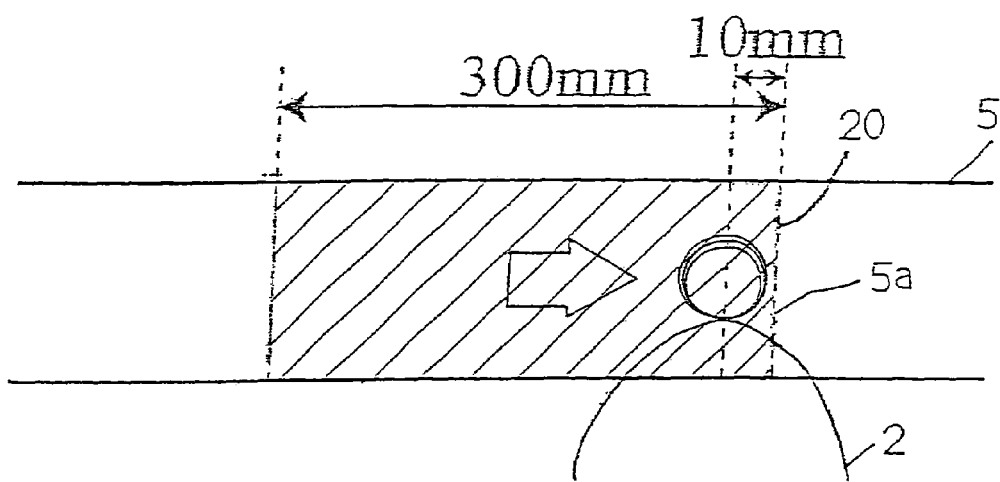
FIG. 23 is a drawing for describing essential parts of a vibration measurement device used in a test example of the present invention.

(3) In FIG. 23, the curved section 20 is located close to the end of the debonded region 5a (a position about 10 mm from the end), and elastic waves were input from the side of the debonded region 5a (the debonded region side).

Figure 24:
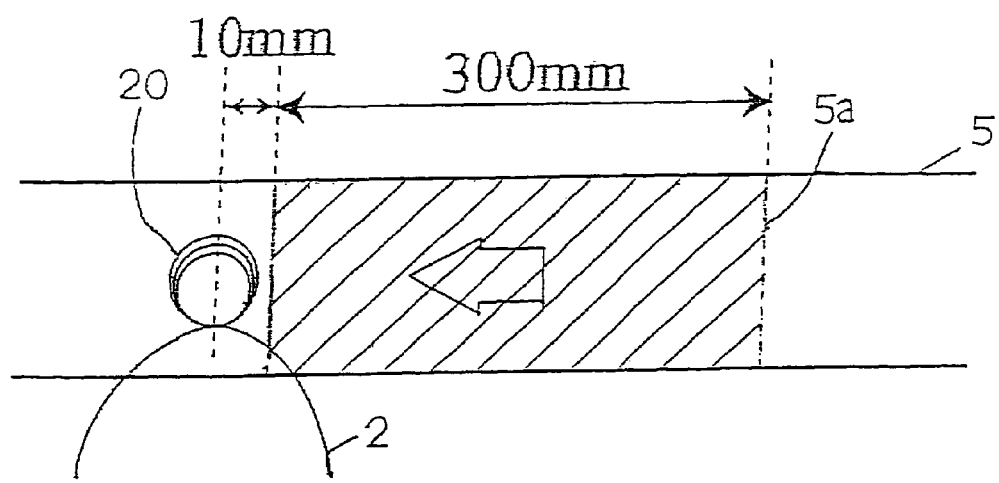
FIG. 24 is a drawing for describing essential parts of a vibration measurement device used in a test example of the present invention.

(4) In FIG. 24, the curved section 20 is located outside the debonded region 5a (a position about 10 mm from the end of the debonded section), and elastic waves were input from the side of the debonded region 5a (debonded region side).

Figure 25:
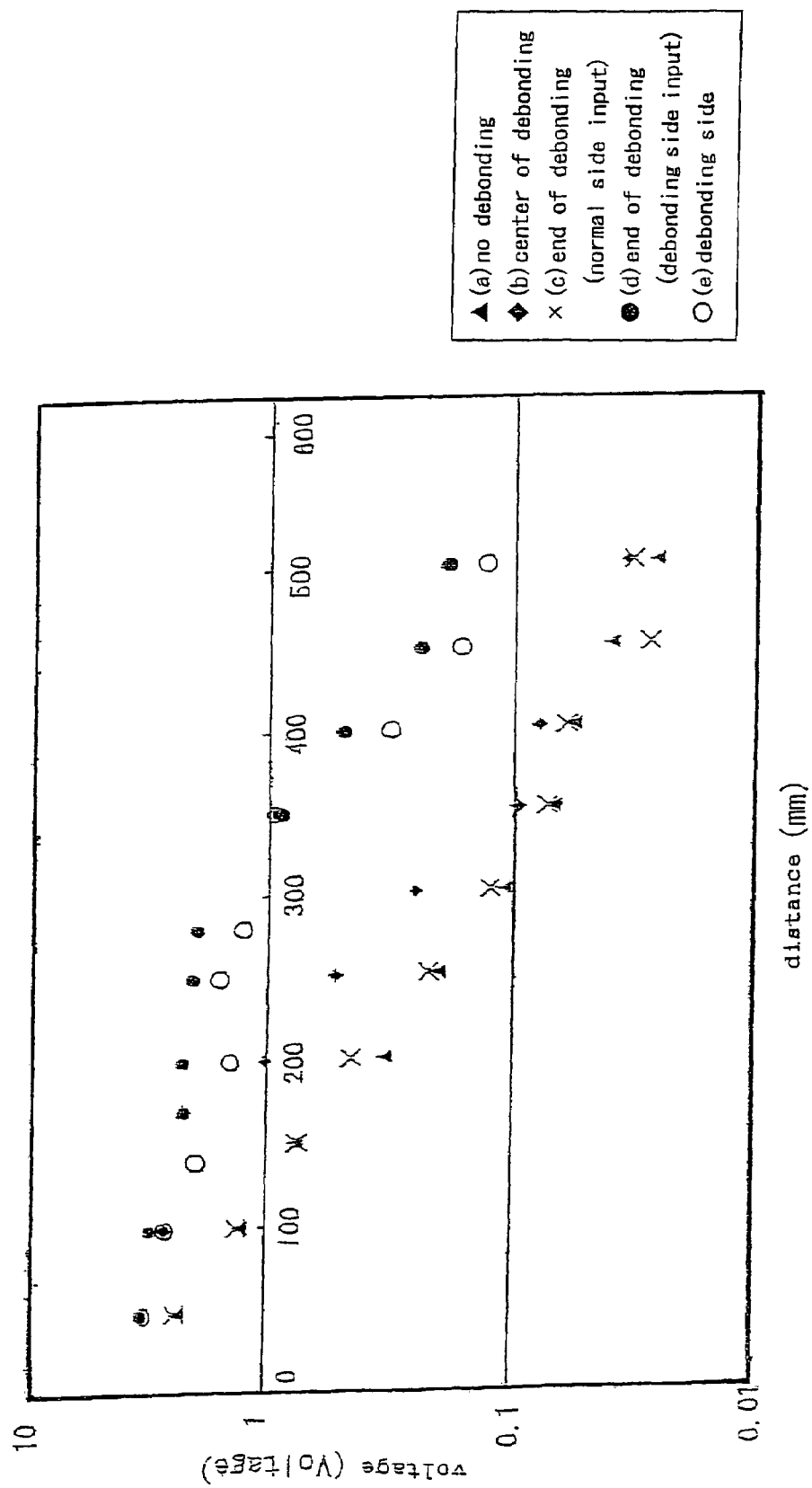
FIG. 25 is a graph showing measurement results for a test example of the present invention.

Under each of the above conditions, a peak value of detected vibration was acquired as a voltage while varying a distance from the vibration source to the curved section 20. Results are shown in FIG. 25. Results in (a) to (e) in FIG. 25 correspond to conditions of FIG. 20-FIG. 24. According to these results, except for the case of FIG. 22 (results (c)), values are different from the case of no debonding (results (a)). It can therefore be considered that it is possible to detect whether or not there is debonding by measuring peak values of vibration.

Figure 26:
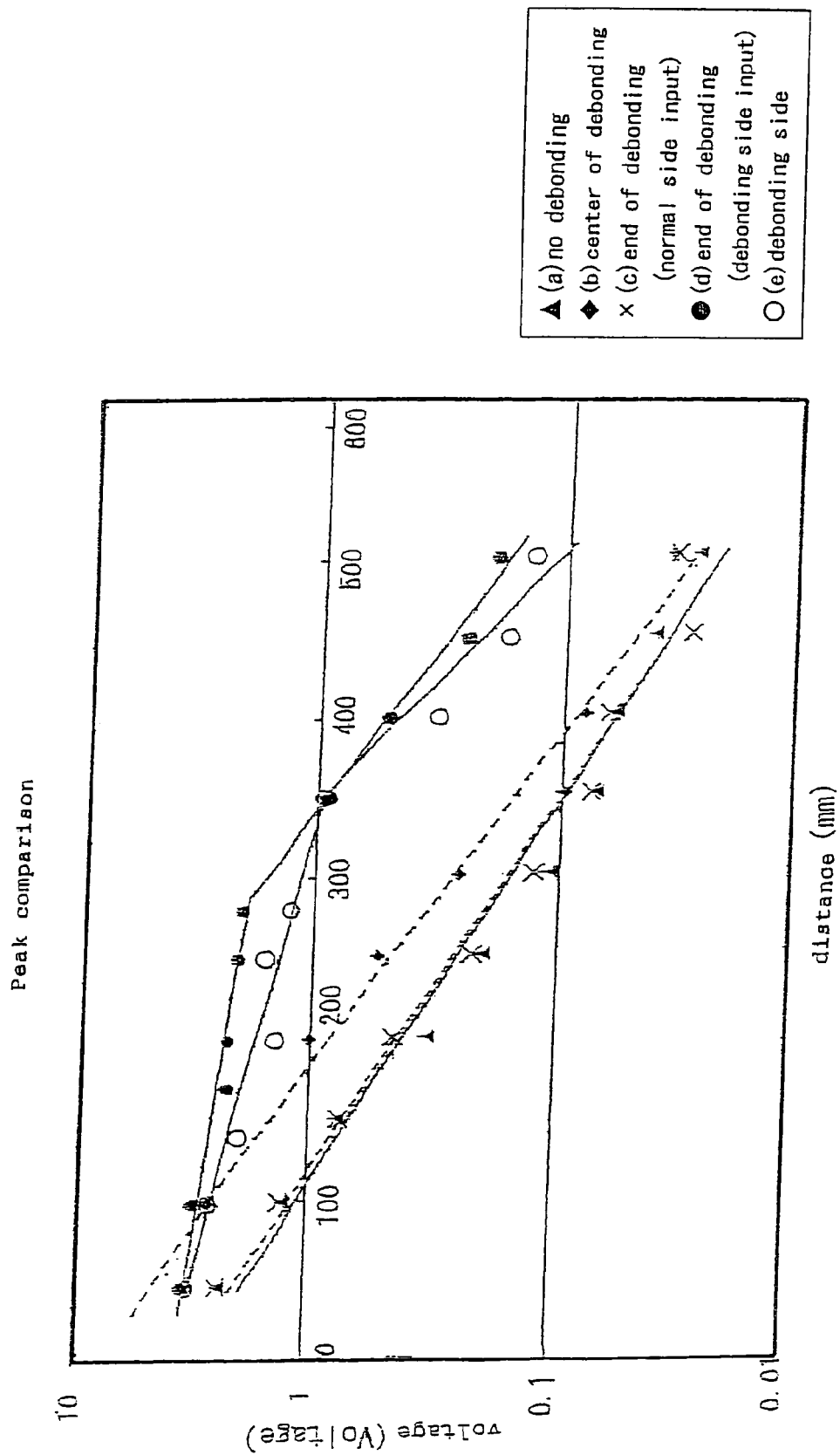
FIG. 26 is a graph showing measurement results for a test example of the present invention.

Further, looking at results (d) and (e) (refer to FIG. 26), the slope of the peak values varies midway. This is because there is different vibration attenuation factor at the debonded region and the normal section, and it is speculated that the peak values will be different depending on whether or not the vibration source is at a debonded region. It is conceivable that it is possible to speculate the position of debonding based on this change point. Also, in the case where vibration is transmitted through the debonded region and the case where vibration is transmitted through a normal section, the magnitude of amplitude differs, which means that it is conceivably possible to detect debonding regardless of whether or not the curved section 20 is in the debonded region.

Next, a measurement device of am eighth embodiment of the present invention will be described based on FIG. 28-FIG. 31. In the following description, light passing through the curved section 20 will be called measurement light, while light constituting a reference for detecting frequency variations in the measurement light will be called reference light. A method of transmitting measurement light and reference light is a combination as shown in FIG. 1.

Figure 28:
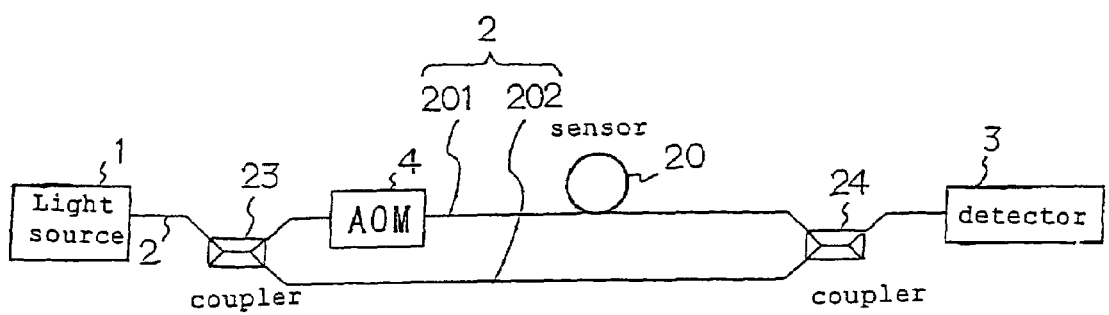
FIG. 28 is a drawing showing an outline of a vibration measurement device of an eighth embodiment of the present invention.

In this table, "one direction" means an optical fiber for transmitting measurement light and reference light extends in one direction without being looped. An example having measurement light and reference light extended in one direction is shown in FIG. 28. Input light input from an input section (light source) 1 to the optical fiber 2 is branched by a coupler 23 and input to a measurement light optical fiber 201 and a reference light optical fiber 202. The optical fibers 201 and 202 constitute parts of the fiber 2. Light passing through the fibers 201 and 202 is combined by a coupler 24 and detected by the detection section 3. The remaining structure is the same as the first embodiment shown in FIG. 1, and so description sections with the same reference numerals will be omitted.

Figure 29:
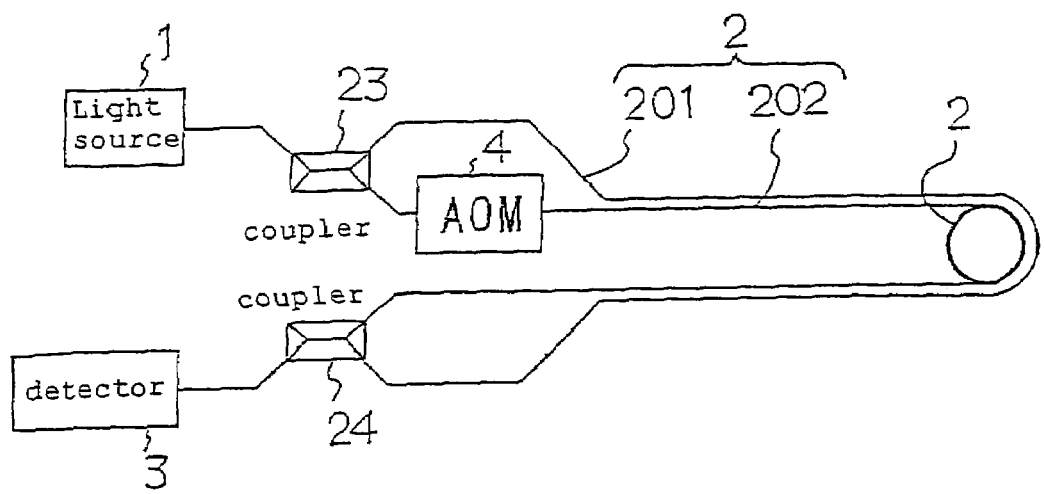
FIG. 29 is a drawing showing a modified example of the vibration measurement device of the eighth embodiment of the present invention.

"Loop" in table 1 means looping the optical fiber and returning it to the input side. FIG. 29 shows the structure having the measurement light optical fiber 201 and the reference light optical fiber 202 looped together. The remaining structure is the same as FIG. 28, and so description of sections having the same reference numerals will be omitted.

Figure 30:
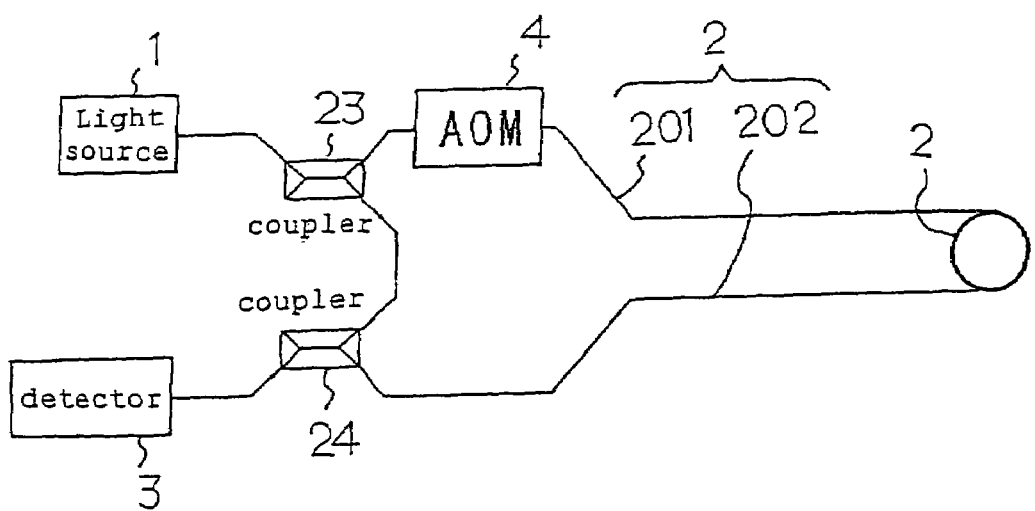
FIG. 30 is a drawing showing a modified example of the vibration measurement device of the eighth embodiment of the present invention.

"Internal" in table 1 means that input light (reference light) does not extend to the object to be measured. A structure having the measurement light optical fiber 201 looped and the reference light optical fiber 202 internally located is shown in FIG. 30. This structure is equivalent to the structure of FIG. 1. The remaining structure is the same as FIG. 28, and so description of sections having the same reference numerals will be omitted.

Figure 31:
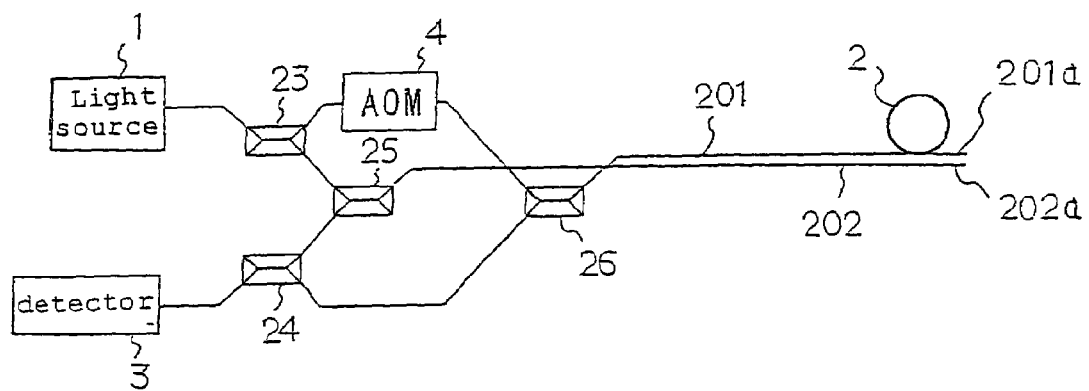
FIG. 31 is a drawing showing a modified example of the vibration measurement device of the eighth embodiment of the present invention.

"Reflected" in table 1 means that light input to the optical fiber (measurement light and reference light) is reflected at the end of the optical fiber. FIG. 31 shows a structure where either the measurement light optical fiber 201 or the reference light optical fiber 202 is made a "reflected" structure. Measurement light and reference light are reflected at end portions 201a and 202a and returned. Returned light is combined by the coupler 24, via the couplers 25 and 26, and transmitted to the detection section 3. The remaining structure is the same as FIG. 28, and so description of sections that have the same reference numerals will be omitted. With this structure, in the case of using reflection, there is the advantage that installation is easy because the optical fiber is allowed to extend to a fiber laying location and appropriately cut at the end.

There is also the advantage that by making the measurement light optical fiber 201 and the reference light optical fiber 202 the same optical path length it is possible to match light frequency dispersion, with the result that measurement precision is improved.

Further, by locating the measurement light optical fiber 201 and the reference light optical fiber 202 in the same path,

TABLE 1 combination of measurement light and reference light

| | | Reference Light | | | |
|---|---|---|---|---|---|
| | | One direction | loop | reflected | internal |
| Measurement Light | One direction | One direction/One direction | | | |
| | loop | | loop/loop | loop/reflected | loop/internal |
| | reflected | | reflected/loop | reflected/reflected | reflected/internal | vibration noise from outside the path is equal, and as a result there is the advantage that it is possible to cancel vibration noise.

Figure 32:
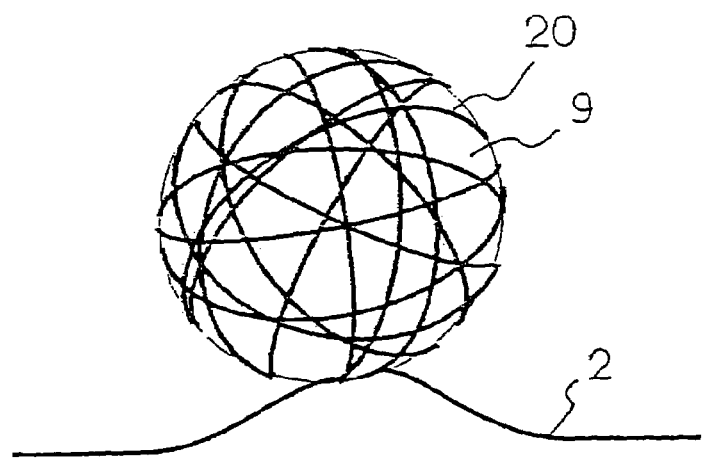
FIG. 32 is a drawing showing the outline of a vibration measurement device of a ninth embodiment of the present invention.

Next, a measurement device of a ninth embodiment of the present invention will be described based on FIG. 32. In this embodiment, the optical fiber 2 is loped around a sphere 9. In this way, the curved section 20 is arranged around the sphere 2.

According to this measurement device, vibration applied to the sphere 9 can be detected using the curved section 20. Accordingly, there is the advantage that it is possible to perform vibration measurement in three dimensions.

Figure 33:
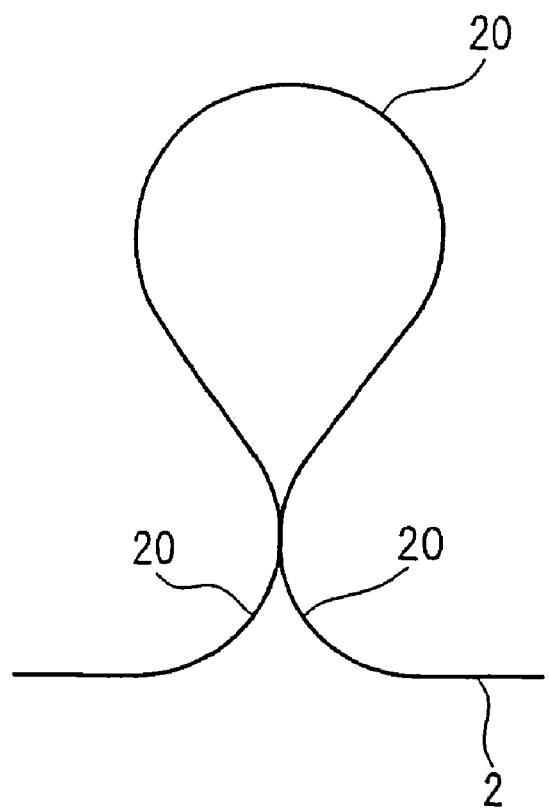
FIG. 33 is a drawing showing a shape of a curved section of the vibration measurement device of the tenth embodiment of the present invention.
Figure 34:
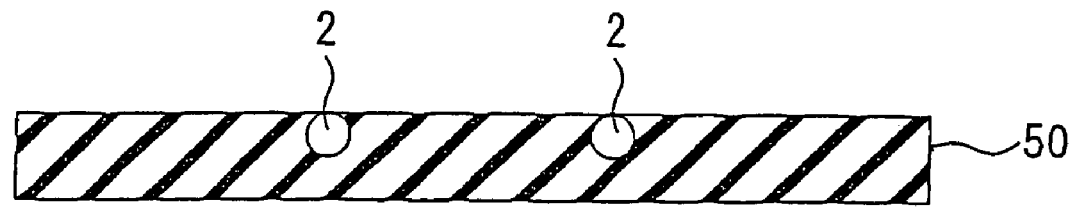
FIG. 34 is a cross-section of an elastic material having a curved section embedded inside a vibration measurement device of the tenth embodiment of the present invention.
Figure 35:
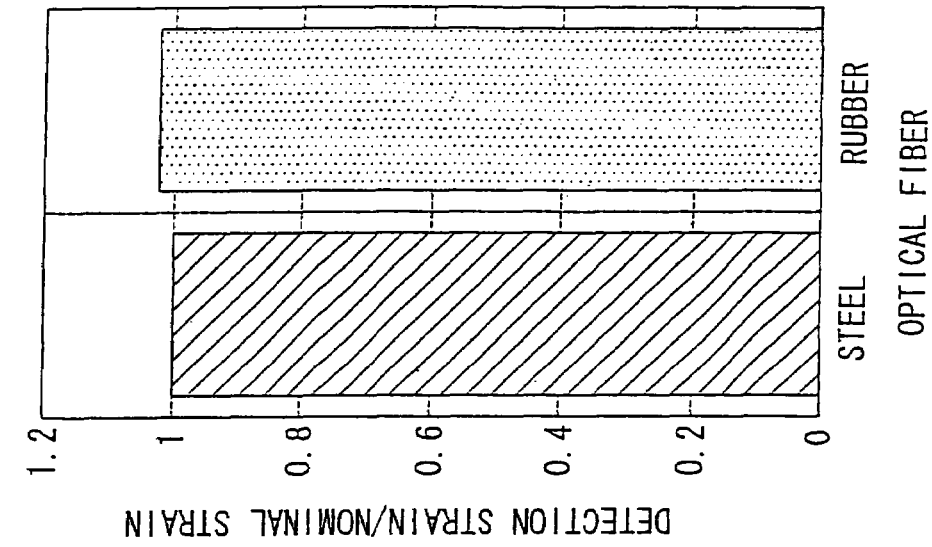
FIG. 35(a) and FIG. 35(b) are graphs showing a test example and a comparative example of the tenth embodiment of the present invention.
Figure 35:
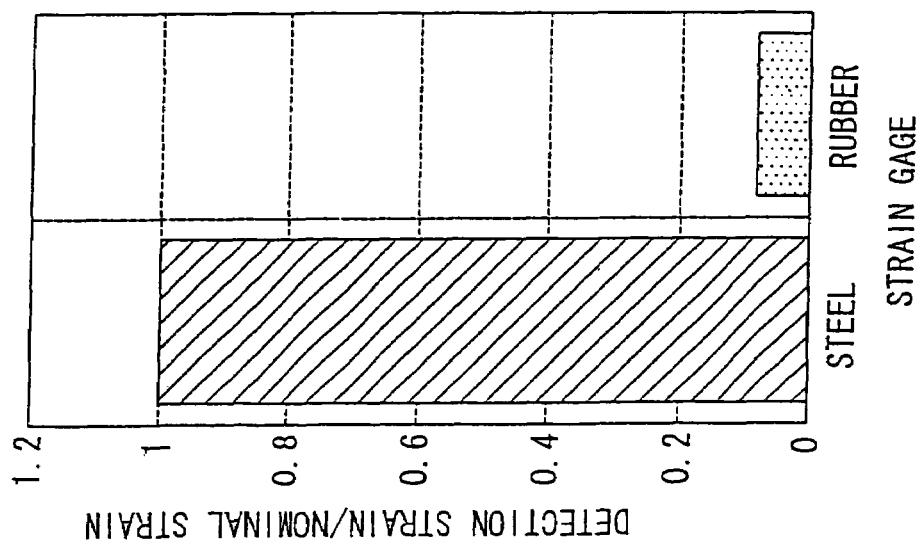

Next, a measurement device of an tenth embodiment of the present invention will be described based on FIG. 33-FIG. 36. In this embodiment, the optical fiber 2 is not looped around, but open ends (refer to FIG. 2) are made close to each other at the curbed section 20 of the optical fiber 2. The measurement device therefore has three curved sections 20, as shown in FIG. 33. The optical fiber 2 having this curved section 20 is embedded inside the elastic material (for example, urethane rubber) 50 (refer to FIG. 34). However, the optical fiber 2 can also be attached onto the surface of the elastic member 50.

EXAMPLES

Testing was carried using the device of the tenth embodiment under the following conditions.
(Experimental Conditions)
Radius of curvature of each curved section: 8 mm
Elastic material: polyurethane
Dimensions of elastic material: 25 mm×200 mm
Frequency of vibration applied to elastic material: 5 Hz to 50 Hz In order to reduce noise, the output from the optical fiber is passed through a 5 kHz low pass filter.
(Experimental Results)

Results are shown in FIG. 35(b). The graph on the right in the drawing shows the result measured by the device of the tenth embodiment. The vertical axis in the drawing is "detection strain/nominal strain". The detection strain is obtained by integrating the frequency variation obtained by the output of the optical fiber, namely vibration. Using the device of this embodiment, a detection result obtained is very close to nominal strain.

The graph on the left in the drawing shows an example of the case utilizing steel instead of urethane rubber. In this case, a curved section 20 is attached to the steel surface.

For reference, the measurement result of strain where a strain gage is attached onto the surface of urethane rubber is shown in a graph on the right in FIG. 35(a). It is difficult to accurately measure strain of a flexible material with a strain gage. The results of measuring a strain of steel using a strain gage are shown on the left in the drawing.

It is possible for the device of the tenth embodiment to measure vibration or strain applied to the elastic material in a comparatively accurate manner. Such a device has a further advantage that it can also measure vibration of a fluid such as gas and liquid.

Figure 36:
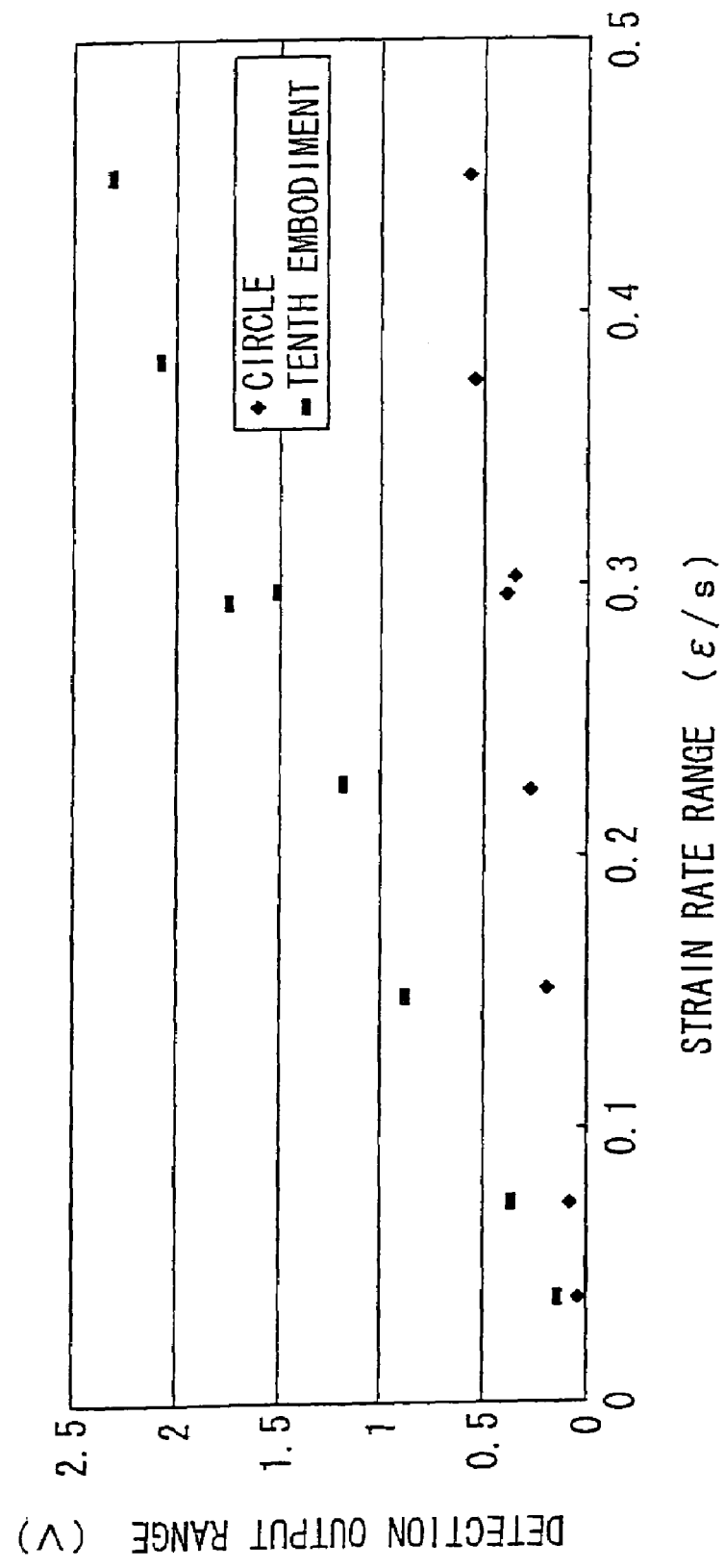
FIG. 36 is a graph showing measurement results for an example of the tenth embodiment of the present invention.

Output using the device of the tenth embodiment is shown in FIG. 36. For comparison, output using a device employing a circular arc curved section as shown in FIG. 6(c) is shown in the same drawing. The vertical axis in this drawing represents measurement values of the device as voltage(V), and the horizontal axis in this drawing shows strain rate, namely vibration. It is clear from this result that it is possible for the device of the tenth embodiment to obtain large output to improve signal to noise ratio.

The device of each of the above described embodiments can also be used, for example, as a sensor for control such as active control. Specifically, the vibration measurement device can be built-in as part of an active control system. In this case, this system received vibration measured by the vibration measurement device, or information corresponding to the measured vibration, as input, and performs control in response to the input. The active control system itself is well known, and so description thereof will be omitted.

The above described embodiments are merely examples, and do not represent the essential structure of the present invention. Various structures are possible without departing from the gist of the present invention.

For example, in each of the embodiments, a curved section 20 is formed on an optical fiber 2. However, a curved section 20 can be formed on other types of light guide other than an optical fiber. In this case, as long as the structure is such that vibration can be transmitted to the curved section 20, it is possible to measure vibration applied to the curved section 20. For example, a light guide having a curved section can be formed on a surface of a substrate such as a polyimide substrate. Other structures may be the same as those in the first embodiment. The light guide can be formed at the inside of the substrate.

INDUSTRIAL APPLICABILITY

According to the present invention, it is possible to provide a vibration measurement device and system for measuring vibration with high sensitivity and over a wide bandwidth.

While the preferred embodiment of the invention has been illustrated and described, it will be appreciated that various changes can be made therein without departing from the spirit and scope of the invention.

The invention claimed is:

1. A vibration measurement device for measuring a vibration of an object, said vibration measurement device comprising an input section, an optical fiber, and a detection section, wherein:
   the input section inputs input light to the optical fiber;
   the optical fiber has a curved section subjected to the vibration, the curved section passing the input light and being disposed on the object so that the curved section and a direction of the vibration are in cross direction therebetween;
   the detection section detects frequency variations between output light from the optical fiber, said output light having passed through the curved section, and the input light; and
   wherein the detection section determines velocity of movement of the object in a direction radial to the curved section using detected frequency variations.

2. The vibration measurement device as disclosed in claim 1, wherein the curved section is formed by looping the optical fiber.

3. The vibration measurement device as disclosed in claim 2, wherein a number of turns of the loop is two or more.

4. The vibration measurement device as disclosed in claim 1, wherein one side of the curved section is in an open state, said one side being a center of curvature side of the curved section.

5. The vibration measurement device as disclosed in claim 1, wherein the curved section is formed by looping the optical fiber around the object.

6. The vibration measurement device as disclosed in claim 1, wherein the curved section is arranged around a sphere.

7. The vibration measurement device as disclosed in claim 1, wherein the curved section is arranged at the inside or surface of an elastic member.

8. The vibration measurement device as disclosed in claim 1, wherein the detection section calculates distortion of the curved section in a direction normal to the curved section using velocity of movement of the curved section.

9. A vibration measurement method comprising the steps of:
arranging a curved section formed at part of an optical fiber at a place to be measured so that the curved section and a direction of vibration are in cross direction therebetween;
detecting frequency variations in light passing through the optical fiber;
determining velocity of movement in a direction radial to the curved section using detected frequency variations; and
outputting a vibration value according to the determined velocity of movement.

10. The vibration measurement device as disclosed in any one of claim 1 to claim 4 or claim 5, wherein the optical fiber comprises a plurality of curved sections.

11. The vibration measurement device as disclosed in claim 10, wherein the plurality of curved sections is subjected to the vibration, the plurality of curved section passing the input light and being disposed on the object so that the plurality of curved sections and a direction of the vibration are in cross direction therebetween.

12. A vibration measurement device for measuring a vibration of an object, said vibration measurement device comprising an input section, a main body, an optical fiber, and a detection section, wherein:
the input section inputs input light to the optical fiber;
the main body is formed in a cylindrical shape and is capable of having a vibration transmitting medium introduced inside;
the optical fiber comprises a curved section formed by looping a portion of the optical fiber around the main body, the curved section passing the input light;
the detection section detects frequency variations between output light from the optical fiber, said output light having passed through the curved section, and the input light; and
wherein the detection section determines velocity of movement in a direction radial to the curved section using detected frequency variations.

13. A vibration measurement device for measuring a vibration of an object, said vibration measurement device comprising an input section, an optical fiber and a detection section, wherein:
the input section inputs input light to the optical fiber;
the optical fiber has a curved section subjected to the vibration, the curved section passing the input light and being formed by looping the optical fiber, a diameter of the curved section being one wavelength or less of the vibration, and the curved section being disposed on the object so that the curved section and a direction of the vibration are in cross direction therebetween;
the detection section detects frequency variations between output light from the optical fiber, said output light having passed through the curved section, and the input light; and
wherein the detection section determines velocity of movement in a direction radial to the curved section using detected frequency variations.

14. A vibration measurement device for measuring a vibration of an object, said vibration measurement device comprising an input section, an optical fiber, and a detection section, wherein:
the input section inputs input light to the optical fiber;
the optical fiber has a curved section subjected to the vibration, the curved section passing input light, one side of the curved section being in an open state, said one side being a center of curvature side of the curved section, an opening length of the curved section being one wavelength or less of the vibration, and the curved section being disposed on the object so that the curved section and a direction of the vibration are in cross direction therebetween;
the detection section detects frequency variations between output light from the optical fiber, said output light having passed through the curved section, and the input light; and
wherein the detection section determines velocity of movement in a direction radial to the curved section using detected frequency variations.

15. A vibration measurement device for measuring a vibration of an object, said vibration measurement device comprising an input section, an optical fiber for measurement light, an optical fiber for reference light, and a detection section, wherein:
the input section inputs measurement light to the measurement light optical fiber, and inputs reference light to the reference light optical fiber;
the measurement light optical fiber has a curved section subjected to the vibration, the curved section passing measurement light and being disposed on the object so that the curved section and a direction of the vibration are in cross direction therebetween;
the detection section detects frequency variations between the measurement light and the reference light that have passed through the optical fibers respectively; and
wherein the detection section determines velocity of movement in a direction radial to the curved section using detected frequency variations.

16. The vibration measurement device as disclosed in claim 15, wherein the measurement light optical fiber and the reference light optical fiber have the same optical path length.

17. The vibration measurement device as disclosed in claim 15 or claim 16, wherein the measurement light optical fiber and the reference light optical fiber are located in the same path.

18. The vibration measurement device as disclosed in claim 15, wherein the measurement light optical fiber and the reference light optical fiber are constructed to cause measurement light and reference light input to the inside of the fibers from the input section to be reflected at end sections, and the detection section detects variation in frequency between the reflected measurement light and reference light.

19. A vibration measurement device for measuring a vibration of an object, said vibration measurement device comprising an input section, a light guide, and a detection section, wherein: the input section inputs input light to the light guide; the light guide has a curved section subjected to the vibration, the curved section passing the input light and being disposed on the object so that the curved section and a direction of the vibration are in cross direction therebetween; the detection section detects frequency variations between output light from the light guide, said output light having passed through the curved section, and the input light; and wherein the detection section determines velocity of movement in a direction radial to the curved section using detected frequency variations.

20. The vibration measurement device as disclosed in claim 19, wherein the light guide is formed at the inside or surface of a substrate.

* * * * *

UNITED STATES PATENT AND TRADEMARK OFFICE
CERTIFICATE OF CORRECTION

PATENT NO. : 7,262,834 B2
APPLICATION NO. : 10/745050
DATED : August 28, 2007
INVENTOR(S) : K. Kageyama et al.

It is certified that error appears in the above-identified patent and that said Letters Patent is hereby corrected as shown below:

| COLUMN | LINE | ERROR |
|---|---|---|
| Title Page, item (73) Pg. 1, col. 1 | Assignee | "Toudai Tlo, Inc.," should read --TOUDAI TLO, LTD.,-- |

Signed and Sealed this

Fifteenth Day of April, 2008

JON W. DUDAS
*Director of the United States Patent and Trademark Office*